(12) United States Patent
Day et al.

(10) Patent No.: US 12,024,367 B1
(45) Date of Patent: Jul. 2, 2024

(54) AUTOMATED CONTAINER PROVISIONING SYSTEMS AND METHODS

(71) Applicant: Amazon Technologies, Inc., Seattle, WA (US)

(72) Inventors: John Daryl Day, Hendersonville, TN (US); Raashid Mohammed, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 17/592,858

(22) Filed: Feb. 4, 2022

(51) Int. Cl.
| | |
|---|---|
| *B65G 15/14* | (2006.01) |
| *B31B 50/92* | (2017.01) |
| *B31B 50/98* | (2017.01) |
| *B65G 15/44* | (2006.01) |
| *B65G 21/20* | (2006.01) |
| *B65G 43/08* | (2006.01) |
| *B31B 50/74* | (2017.01) |
| *B65G 15/02* | (2006.01) |
| *B65G 15/58* | (2006.01) |

(52) U.S. Cl.
CPC .............. *B65G 15/14* (2013.01); *B31B 50/92* (2017.08); *B31B 50/98* (2017.08); *B65G 15/44* (2013.01); *B65G 21/2063* (2013.01); *B65G 43/08* (2013.01); *B31B 50/74* (2017.08); *B65G 15/02* (2013.01); *B65G 15/58* (2013.01); *B65G 2203/0208* (2013.01); *B65G 2203/0266* (2013.01)

(58) Field of Classification Search
CPC ........ B65G 15/14; B65G 15/20; B65G 15/44; B65G 21/2063; B65G 21/2072; B65G 43/08; B65G 15/02; B65G 15/58; B65G 2203/0208; B65G 2203/0266; B31B 50/98; B31B 50/74; B31B 50/92; B31B 50/94; B31B 50/96
See application file for complete search history.

(56) References Cited

U.S. PATENT DOCUMENTS

| | | | | |
|---|---|---|---|---|
| 3,122,070 | A * | 2/1964 | Kauffman | B31B 50/00 493/332 |
| 3,648,605 | A * | 3/1972 | Hottendorf | B31B 50/00 101/232 |
| 4,197,789 | A * | 4/1980 | Moen | B31B 50/44 493/167 |
| 6,863,644 | B1 * | 3/2005 | Cook | B31B 50/00 493/69 |
| 7,156,222 | B2 * | 1/2007 | Schnuelle | B65B 43/14 198/626.5 |
| 8,684,657 | B2 * | 4/2014 | Pini | B65H 29/12 198/408 |
| 9,409,369 | B2 * | 8/2016 | Kleiner | B31B 50/74 |
| 2018/0015682 | A1 * | 1/2018 | Iori | B65H 29/52 |

* cited by examiner

*Primary Examiner* — Mark A Deuble
(74) *Attorney, Agent, or Firm* — Athorus, PLLC

(57) ABSTRACT

Automated container provisioning systems described herein may include one or more pairs of transport belts, one or more guide surfaces, and one or more sensors. The transport belts may engage flaps or other portions of containers, and the guide surfaces may support surfaces or other portions of containers, in order to transport containers to downstream stations within a facility. In addition, the sensors may detect containers during transport, responsive to which various additional operations may be performed with respect to containers, such as sortation, printing, labeling, tracking, packing, accumulation, or others.

19 Claims, 15 Drawing Sheets

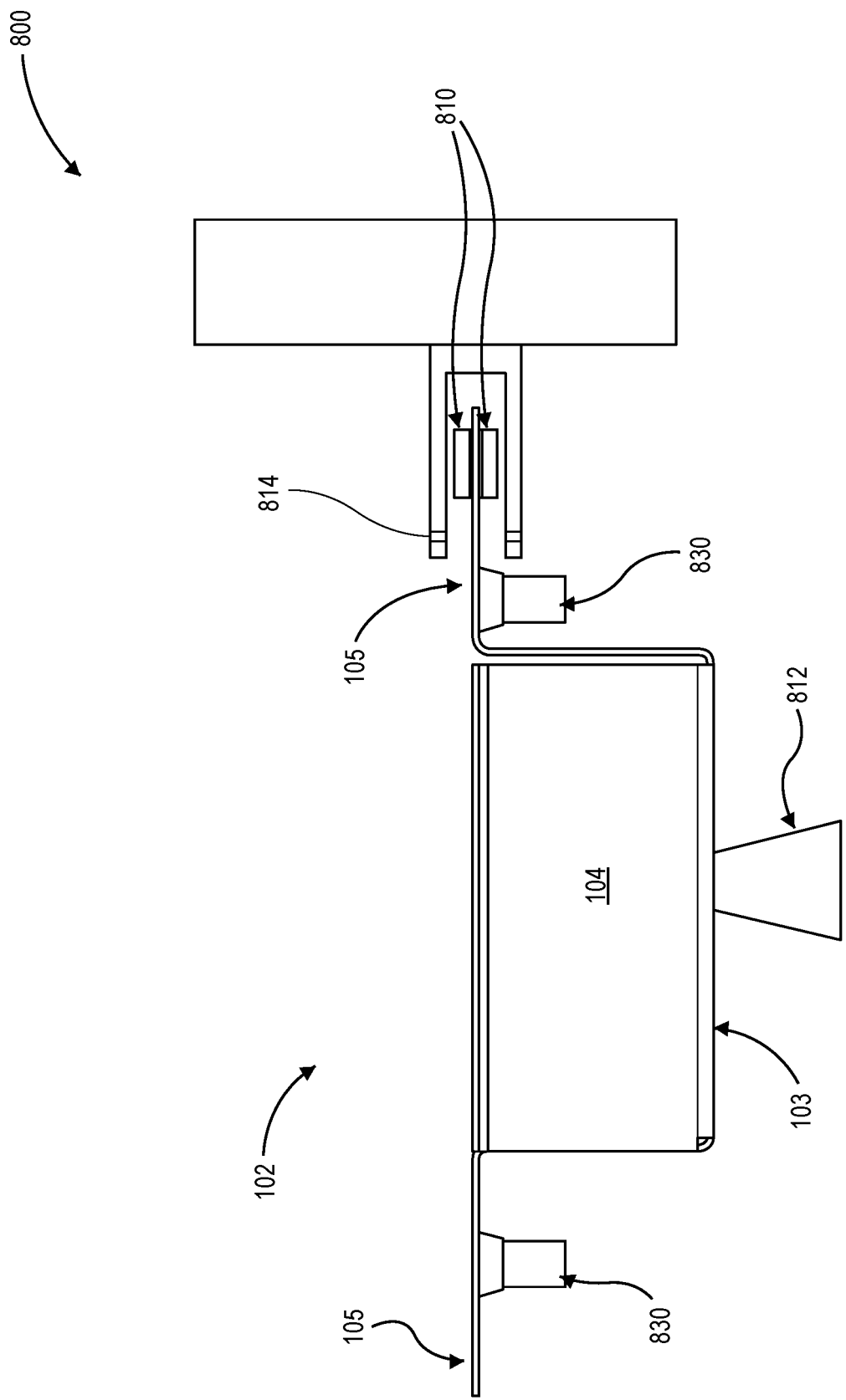

AUTOMATED CONTAINER PROVISIONING SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may pack items into boxes, totes, or other containers for shipping. However, receipt, storage, sortation, transport, and provisioning of containers within material handling facilities are generally manual, time-consuming, and expensive processes. Accordingly, there is a need for reliable and efficient automated systems and methods to provision containers with respect to various processes within material handling facilities.

BRIEF DESCRIPTION OF THE DRAWINGS

FIG. 8 is a schematic, side view diagram of a portion of another example container transport system, in accordance with implementations of the present disclosure.

DETAILED DESCRIPTION

As is set forth in greater detail below, implementations of the present disclosure are directed to automated container provisioning systems and methods that may provide containers in a reliable and efficient manner to support various operations within a material handling facility, such as packing, picking, sortation, tracking, accumulation, storage, transport, shipping, recycling, disposal, or other operations.

In example embodiments, a container may comprise a box, e.g., a cardboard box, that may be erected or assembled by an automatic case or box erector. For example, the box may be partially erected or assembled, such that the box includes a base, one or more side surfaces, and one or more flaps. In other example embodiments, a container may comprise a bin, tote, or other similar container, and the container may comprise a flap, flange, surface, extension, wing, lid, or cover that may extend from a portion of the container.

In example embodiments, the container provisioning and transport systems described herein may transport the container in the partially erected configuration or arrangement. For example, the container provisioning and transport systems may comprise at least one pair of transport belts, e.g., pinch belts, that engage with a flap, flange, surface, extension, wing, lid, or cover of the container. In addition, the container provisioning and transport systems may comprise at least one guide surface that supports at least one other surface of the container, e.g., a base, side surface, flap, flange, surface, extension, wing, lid, or cover. Further, the container provisioning and transport systems may comprise one or more actuators or motors that drive the transport belts to move and transport the container via the engaged flap and the supported surface. Moreover, the container provisioning and transport systems may comprise one or more sensors that detect, identify, count, or track the container during transport by the transport belts within the material handling facility.

In additional example embodiments, the container provisioning and transport systems may comprise one or more divert or sortation operations to transport the container to various portions of the material handling facility. In addition, the container provisioning and transport systems may comprise one or more additional operations, e.g., printing, applying labels, packing, picking, scanning, sortation, counting, tracking, or other operations, that may be performed during transport by the transport belts within the material handling facility. Furthermore, the container provisioning and transport systems may comprise one or more container accumulation operations to sort, buffer, and/or store the container proximate a downstream station or process for further operations.

Figure 1:
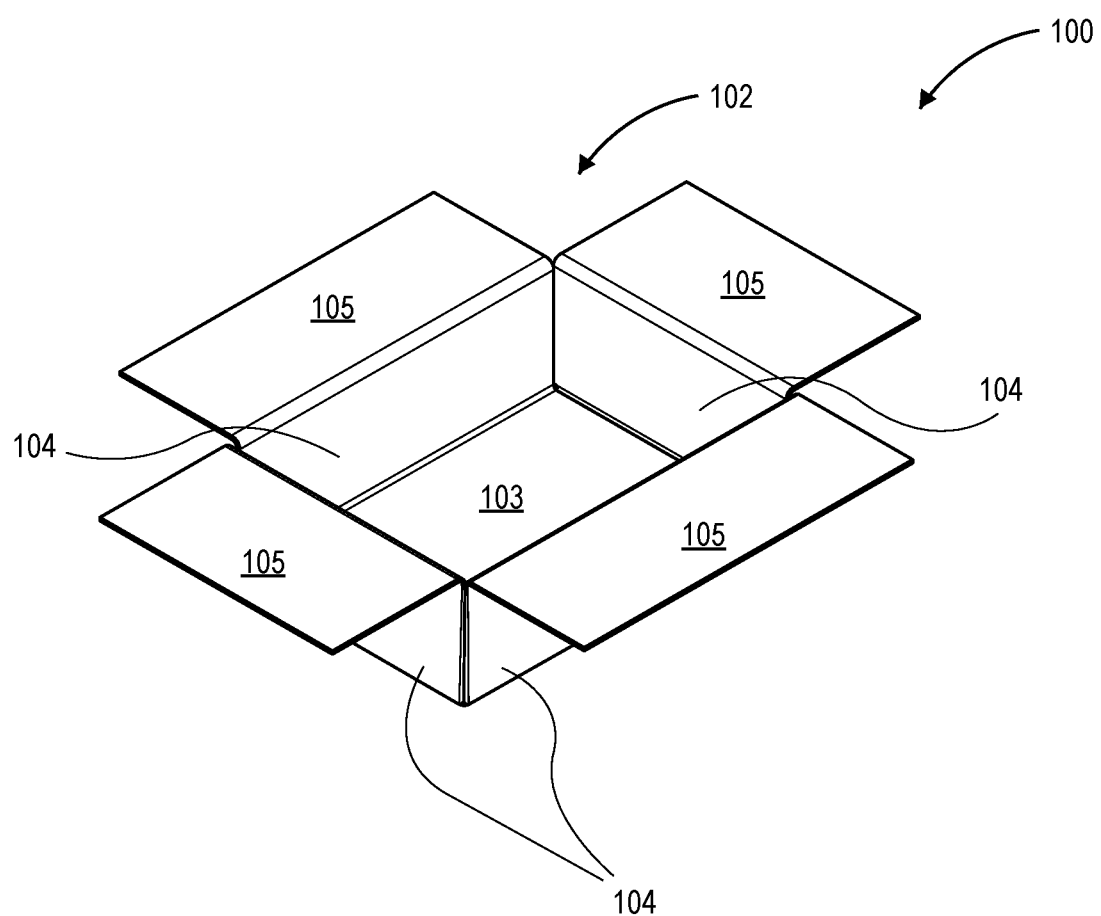
FIG. 1 is a schematic, perspective view diagram of an example container, in accordance with implementations of the present disclosure.

FIG. 1 is a schematic, perspective view diagram 100 of an example container, in accordance with implementations of the present disclosure.

As shown in FIG. 1, an example container 102 may comprise a box, e.g., a cardboard box, that may be erected or assembled by an automatic case or box erector. For example, the box may be partially erected or assembled, such that the box includes a base 103, one or more side surfaces 104, and one or more flaps 105.

In some example embodiments, the base 103 may be formed from one or more flaps that have been folded, bent, arranged, taped, and/or adhered to form a bottom of the container 102. In addition, the one or more side surfaces 104 may extend upward from the base 103 and may, together with the base 103, define an interior space of the container 102, into which one or more items may be placed or packed. Further, the one or more flaps 105 may facilitate closing of the interior space of the container 102, and may be folded, bent, arranged, taped, and/or adhered to form a top of the container 102.

The base 103, side surfaces 104, and flaps 105 of various example containers 102 may have various dimensions in order to form different containers having different overall dimensions, e.g., length, width, and height. Various types of items may be placed or packed into example containers 102, including but not limited to books, electronics, clothing, food, appliances, or various other types of items. Further, the example containers 102 may be generally formed of cardboard, but may also be formed of other types of materials, e.g., paper, plastic, composites, other materials, or combinations thereof.

In other example embodiments, an example container 102 may comprise a bin, tote, or other similar container. For example, the example container 102 may also comprise a base, one or more side surfaces, and one or more flaps, flanges, surfaces, extensions, wings, lids, or covers that may extend from a portion of the container 102. In addition, a flap, flange, surface, extension, wing, lid, or cover may extend from a portion of the container 102 in a manner similar to a flap 105 as shown in FIG. 1. Further, the flap, flange, surface, extension, wing, lid, or cover may be integrally formed with the container 102, may be temporarily, removably, or permanently coupled to the container 102, may be rigidly attached or coupled to the container 102, and/or may be hingedly, pivotably, or movably coupled to the container 102. Moreover, the example container 102 comprising a bin, tote, or other similar container may be generally formed of plastic, but may also be formed of other types of materials, e.g., paper, cardboard, composites, other materials, or combinations thereof.

Although FIG. 1 illustrates a particular size, arrangement, or configuration of an example container, various other types of containers having different sizes, arrangements, or configurations may also be provisioned by the container provisioning and transport systems and methods described herein. In addition, although FIG. 1 and various other FIGs. herein illustrate a container 102 having flaps 105 that are bent or folded approximately 90 degrees with respect to adjacent side surfaces 104 of the container 102, other example embodiments may include a container 102 having only one flap 105 to be engaged by the container provisioning system that is bent or folded approximately 90 degrees, or at other angles, with respect to an adjacent side surface 104 of the container 102, and having remaining flaps 105 that are not bent or folded and instead extend substantially coplanar with adjacent side surfaces 104 of the container 102.

Figure 2:
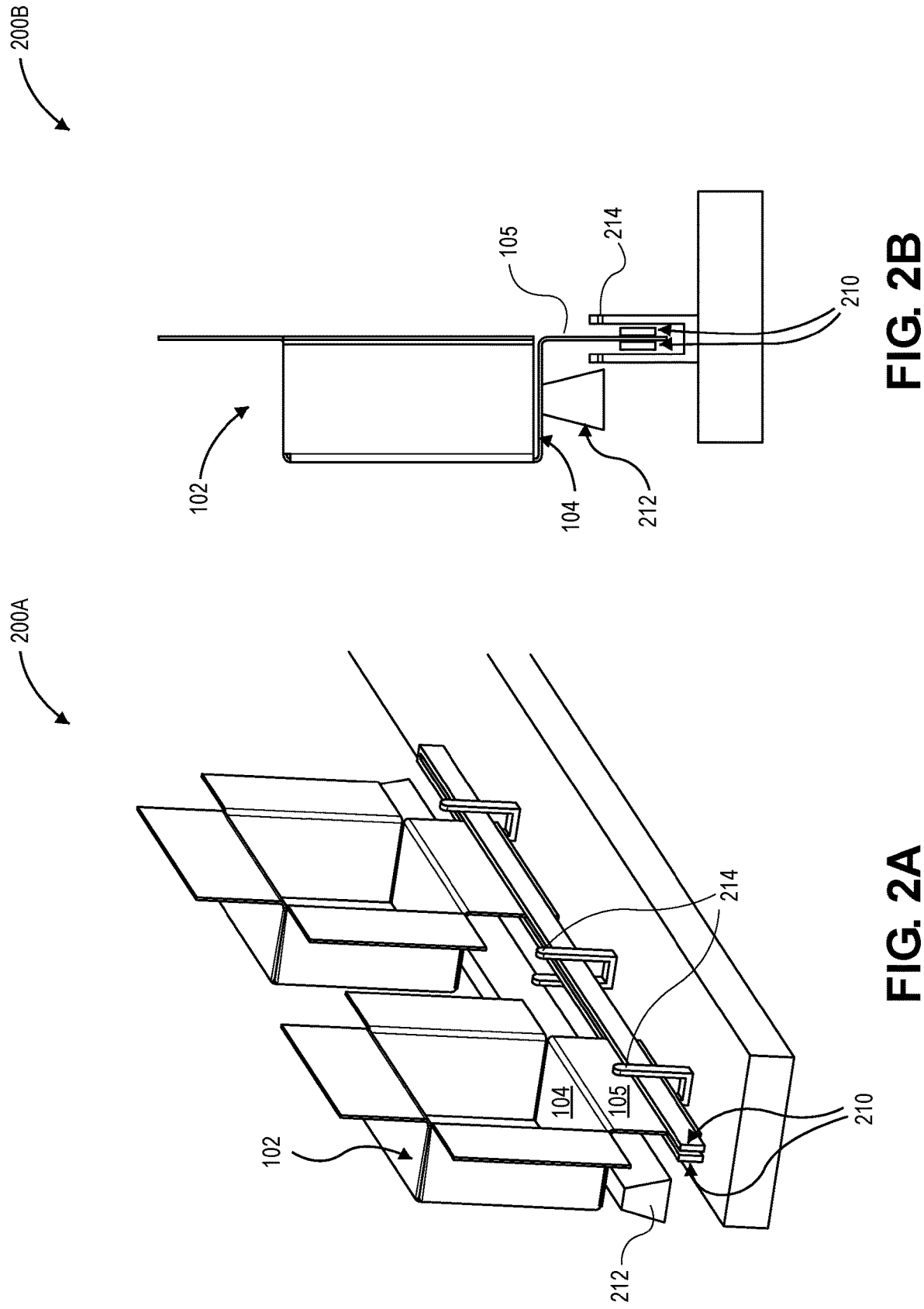
FIG. 2A is a schematic, perspective view diagram of a portion of an example container transport system, in accordance with implementations of the present disclosure.
FIG. 2B is a schematic, side view diagram of a portion of the example container transport system of FIG. 2A, in accordance with implementations of the present disclosure.

FIG. 2A is a schematic, perspective view diagram 200A of a portion of an example container transport system, in accordance with implementations of the present disclosure, and FIG. 2B is a schematic, side view diagram 200B of a portion of the example container transport system of FIG. 2A, in accordance with implementations of the present disclosure.

As shown in FIGS. 2A and 2B, a portion of an example container transport, or container provisioning, system may include one or more pairs of transport belts 210, one or more guide surfaces 212, and/or one or more sensors 214. The example container provisioning system may receive, sort, divert, distribute, store, buffer, accumulate, dispense, transport, and/or provision one or more containers 102 between and among various portions of a material handling facility.

In example embodiments, the example container provisioning systems described herein may substantially automatically provision containers within a material handling facility, may have a smaller physical footprint within a material handling facility as compared to conventional transport systems such as conveyor systems, may sort, store, accumulate, and dispense containers efficiently and reliably to various stations, and/or may perform various additional operations with respect to the containers during transport by the example container provisioning systems within a material handling facility.

The one or more pairs of transport belts 210 may comprise pinch belts, conveyor-type belts, or other types of transport belts. For example, a pair of transport belts 210 may receive a portion of a container 102 therebetween, such as a flap 105 of a container 102. The pair of transport belts 210 may apply friction to the received flap 105 in order to engage and grip the flap 105 of the container. For example, a first belt of the pair of transport belts 210 may engage a first face of the flap 105, and a second belt of the pair of transport belts 210 may engage a second, opposite face of the flap 105.

Generally, the amount of friction applied to the flap 105 may be high enough such that the container 102 may be reliably gripped and moved by the transport belts 210 without slipping or release of the flap 105 relative to the transport belts 210. For example, the amount of friction applied to the flap 105 by the pair of transport belts 210 may vary, and may depend on a spacing between the pair of transport belts 210, a tension along the pair of transport belts 210, and/or a force applied to one or both of the pair of transport belts 210.

In some example embodiments, the spacing between the pair of transport belts 210 may be less than a thickness of the flap 105, e.g., approximately 10%, approximately 20%, approximately 30%, or other amounts or percentages less than a thickness of the flap 105 to be engaged. In additional example embodiments, the tension along the pair of transport belts 210 may be selected, instructed, or modified to apply a desired amount of force to the flap 105 to be engaged between the pair of transport belts 210. In further example embodiments, the force applied to one or both of the pair of transport belts 210 may be selected, instructed, or modified to apply a desired amount of force to the flap 105 to be engaged between the pair of transport belts 210, and the force may be applied by rollers, wheels, guides, tensioners, idlers, or other structures or components positioned, continuously or intermittently, along the length of the transport belts 210.

The transport belts 210 may be formed of various types of materials to provide friction to engage a flap 105 of a container 102, such as plastics, rubber, silicone, composites, other materials, or combinations thereof. In addition, the transport belts 210 may include various dimensions or sizes, such as various different lengths, widths, and thicknesses. Moreover, the transport belts 210 may include various cross-sectional shapes, such as circular, oval, rectangular, square, substantially flat or planar, curved, concave, convex, or other shapes. Further, the transport belts 210 may include one or more features on surfaces or edges of the transport belts 210 to facilitate frictional engagement with a flap 105 of a container 102, such as ribs, protrusions, dimples, or other engagement or gripping features. In addition, the engagement features may also be formed of various types of materials as described herein to provide friction to engage a flap 105 of a container 102.

One or more actuators or motors may drive or cause movement of the transport belts 210. For example, the one or more actuators may comprise motors, rotary actuators, or other types of actuators that may drive the transport belts 210 in a manner substantially similar to other belt conveyance mechanisms. In addition, the one or more actuators may control a speed, acceleration, or other aspects of movement and transport of a container via the transport belts 210.

Further, various pulleys, tensioners, idlers, rollers, wheels, guides, or other structures or components may be included or positioned along the transport belts 210 in order to route the transport belts 210 among various portions of a material handling facility. Moreover, the various pulleys, tensioners, idlers, rollers, wheels, guides, or other structures or components, in combination with the actuators or motors, may be controlled during actuation or movement of the transport belts 210 in order to select, control, or modify spacing, tension, and/or force associated with the transport belts 210.

In some example embodiments, the tension along the transport belts and/or force applied to the transport belts may be reduced or otherwise modified at various points along the transport belts in order to facilitate engagement of a container, movement or reorientation of a container, release of a container, rotation or twist of a container, turning or rerouting of a container, diversion or sortation of a container between various paths of multiple transport belts, and/or various other operations.

In further example embodiments, a first belt of a pair of transport belts 210 may have a first friction coefficient and/or apply a first amount of friction to a flap of a container, and a second belt of a pair of transport belts 210 may have a second friction coefficient and/or apply a second amount of friction to a flap of a container. The first friction coefficient may be different from the second friction coefficient, and/or the first amount of friction may be different from the second amount of friction. For example, the first belt may be made of a first material, may have first surface or edge features, may have a first belt tension, and/or other first aspects or characteristics, and the second belt may be made of a second material, may have second surface or edge features, may have a second belt tension, and/or other second aspects or characteristics, such that the first belt and the second belt have different friction coefficients and/or apply different amounts of friction to a flap of a container engaged therebetween. In this manner, a first belt of a pair of transport belts having a lower friction coefficient may enable some slip or movement of the first belt relative to the engaged flap during portions of movement or transport, while a second belt of the pair of transport belts having a higher friction coefficient may maintain frictional engagement between the second belt and the engaged flap during substantially all portions of movement or transport.

In various example embodiments, altering or modifying the tension along the transport belts and/or force applied to the transport belts, and/or having different friction coefficients or different amounts of applied friction of the transport belts, may facilitate various operations of the container provisioning systems. For example, a container may be turned or rerouted around a bend or curve along a path of the transport belts during transport, e.g., a curve around an axis or line that extends substantially transverse to a direction of travel of the transport belts and in which the axis or line is substantially parallel to a plane associated with a flap of a container engaged by the transport belts. During such operations, modified spacing, modified tension, modified applied force, and/or different friction characteristics of the belts may facilitate smoother and more reliable movement and transport of a container around such bends or curves along a path of the transport belts.

In additional examples, a container may be rotated or twisted around a direction of travel of the transport belts during transport, e.g., around an axis or line extending along or substantially collinear with a path or direction of travel of the transport belts. During such operations, modified spacing, modified tension, modified applied force, and/or different friction characteristics of the belts may facilitate smoother and more reliable rotation or twisting during movement and transport of a container along such portions of a path of the transport belts.

In further example embodiments, at one or more portions or sections of an example container transport or provisioning system, a pair of transport belts 210 may instead comprise a single belt and an additional component that together receive and engage a flap or other portion of a container. For example, the additional component may comprise one or more rollers, wheels, bullwheels, spring-loaded friction shoes, or other types of components that may facilitate engagement of a flap or other portion of a container between the single belt and the additional component. In still further example embodiments, at one or more portions or sections of an example container transport or provisioning system, a pair of transport belts 210 may instead comprise a single belt that maintains engagement with a flap or other portion of a container using suction or vacuum pressure. In this example, the additional component may comprise holes, pores, orifices, channels, or other structures that facilitate airflow through the material of the belt, and suction or vacuum pressure may be applied via the holes, orifices, or channels of the belt in order to maintain engagement between the single belt and a flap or other portion of a container. In some examples, the single belt and the additional component may be used to engage a flap or other portion of a container at a transition associated with a portion or section of the container transport system, such as a curve, turn, bend, twist, divert, sort, release, or other transition or operation during transport of a container.

The one or more guide surfaces 212 may comprise passive or active guide surfaces that may support one or more surfaces, flaps, edges, or other portions of a container that is moved and transported by the transport belts 210. For example, passive guide surfaces may generally be static or stationary surfaces along which a surface, flap, edge, or other portion of a container may move or slide, and the passive guide surfaces may comprise flat surfaces, edges, slides, guides, poles, bars, beams, or other surfaces and/or materials. In addition, active guide surfaces may generally comprise active, actuatable, or movable surfaces or portions thereof along which a surface, flap, edge, or other portion of a container may move or slide, and the active guide surfaces may comprise belts, conveyors, rollers, wheels, or other structures or components, and any associated actuators, motors, or other active components.

In some example embodiments, various combinations of passive and/or active guide surfaces 212 may be used in combination with the one or more transport belts 210 in order to move and transport a container within a material handling facility. The guide surfaces 212 may be formed of various types of materials, such as metals, plastics, rubber, silicone, wood, composites, other materials, or combinations thereof.

In example embodiments, the guide surfaces 212 may extend substantially in parallel with a path of the transport belts 210, and may extend substantially along a direction of travel of a container as moved and transported by the transport belts 210. In this manner, the guide surfaces 212 may reliably and substantially continuously support one or more surfaces, flaps, edges, or other portions of a container during transport by the transport belts 210.

In the example embodiment illustrated in FIGS. 2A and 2B, the pair of transport belts 210 may engage a flap 105 that is oriented toward a bottom or base of the container provisioning system. In addition, the guide surface 212 may contact and support a side surface 104 that is adjacent to and coupled to the flap 105 that is engaged by the pair of transport belts 210. Using this combination of engaged flap 105 and adjacent supported side surface 104, various types, sizes, or configurations of containers may be received, engaged, and transported by the container provisioning system.

For example, as long as the flap 105 has sufficient area or planar extent to be engaged by the pair of transport belts 210, different containers having various lengths and widths (e.g., defined as extending orthogonally within a plane that is substantially parallel with a plane of a base 103 of a container 102) may be engaged by the transport belts 210 and supported by the guide surface 212. In addition, as long as a portion of the side surface 104 contacts and is supported by the guide surface 212, different containers having various heights (e.g., defined as extending perpendicularly with respect to a plane of a base 103 of a container 102) may also be engaged by the transport belts 210 and supported by the guide surface 212. As a result, the container provisioning system described herein may occupy a smaller physical footprint than conventional conveyance mechanisms, and may also efficiently and effectively receive, engage, and transport various types or sizes of containers in an automated manner.

The one or more sensors 214 may comprise photoeyes, discrete counters, presence detection sensors, proximity sensors, imaging devices, scanning devices, or other types of sensors to detect aspects or characteristics of containers 102 and/or their movement. In addition, the one or more sensors 214 may also comprise encoders, optical surface speed detection sensors, or other types of sensors to detect aspects or characteristics of movement of the transport belts 210 and/or containers 102.

As shown in FIGS. 2A and 2B, the one or more sensors 214 may be positioned or arranged proximate the transport belts 210 in order to detect a portion of a container 102 that is moved by the transport belts 210, e.g., to detect a flap 105 that is engaged by the transport belts 210. In other example embodiments, the one or more sensors 214 may be positioned or arranged in other positions or orientations to detect various other portions of a container 102 that is moved by the transport belts 210. For example, the one or more sensors 214 may be positioned on, adjacent, or proximate the guide surface 212 to detect a portion of the side surface 104 that contacts and is supported by the guide surface 212. Alternatively or in addition, the one or more sensors 214 may be positioned at various other positions of the container provisioning system to detect one or more portions of a container 102, e.g., a base 103, a side surface 104, or a flap 105, that is moved by the transport belts 210.

For example, the one or more sensors 214 may detect a leading edge of a flap 105 (or other portion or surface) of a container 102 at a particular position, may detect a presence or absence of a flap 105 (or other portion or surface) of a container 102 at a particular position, and/or may detect a trailing edge of a flap 105 (or other portion or surface) of a container 102 at a particular position. In addition, the one or more sensors 214 may detect data associated with a speed, acceleration, or other aspects of movement of transport belts 210 and/or containers 102, and/or may detect data associated with a direction of movement of transport belts 210 and/or containers 102. Further, the one or more sensors 214 may detect data associated with an identifier, label, or other identifying information associated with a container 102.

Moreover, the data captured by the one or more sensors 214 may be processed to performed various operations, such as counting a number of containers, identifying a container, and/or tracking a position or movement of a container. Further, the data captured by the one or more sensors 214 may be processed and used to instruct one or more additional operations, such as printing onto a container, applying a label to a container, packing one or more items into a container, scanning or imaging a container or contents thereof, diverting or sorting a container to a downstream station or other desired portion of a material handling facility, and/or storing, buffering, or accumulating a container at an accumulation system.

In additional example embodiments, various combinations of one or more different types of sensors may be used to detect various aspects of operation of a container transport system. For example, one or more sensors, e.g., photoeyes, may detect aspects of a container during transport, and one or more sensors, e.g., encoders, may detect aspects of movement of transport belts during transport of the container. The various data detected by various combinations of sensors may enable more accurate and/or precise control of various operations of the container transport system, such as precise control over movements of the transport belts in combination with accurate engagement and/or release of containers as desired. Moreover, the various data detected by various combinations of sensors may enable more accurate and/or precise control of various operations of the container transport system at relatively higher speeds and/or with relatively tighter or smaller gaps between containers during transport.

Although FIGS. 2A and 2B illustrate a single pair of transport belts 210, other example embodiments may include other numbers of pairs of transport belts, such as two pairs of transport belts that each engage respective flaps on opposite sides of a container. In some example embodiments that utilize multiple pairs of transport belts, the one or more guide surfaces described herein may be optional. Further, although FIGS. 2A and 2B illustrate a single guide surface 212, other example embodiments may include other numbers, arrangements, or configurations of guide surfaces, such as two or more guide surfaces that may support the same or different surfaces of a container. Various other example embodiments may include other numbers, arrangements, or configurations of the structures and components described herein.

Moreover, although not illustrated in FIGS. 2A and 2B, or various other FIGs. herein, the one or more pairs of transport belts 210, the one or more guide surfaces 212, the one or more sensors 214, and/or various other structures or components of the example container provisioning system may be coupled to and supported by various structural elements, such as beams, platforms, stands, tables, or other structures in order to be positioned within a material handling facility. For example, the transport belts 210 and associated actuators and other components may be coupled to and supported by various beams, platforms, stands, tables, or other structures to facilitate placement and operation of such components within a material handling facility. In addition, the guide surfaces 212 and any associated actuators and other components may also be coupled to and supported by various beams, platforms, stands, tables, or other structures to facilitate placement and operation of such components within a material handling facility. Moreover, various portions of the container provisioning system described herein may be placed and supported on a ground, a floor, a mezzanine, an upper level, or other support surfaces within portions of a material handling facility, and/or various portions of the container provisioning system described herein may be positioned and supported by overhead, overhanging, suspended, or cantilevered structures or components within portions of a material handling facility.

Figure 3:
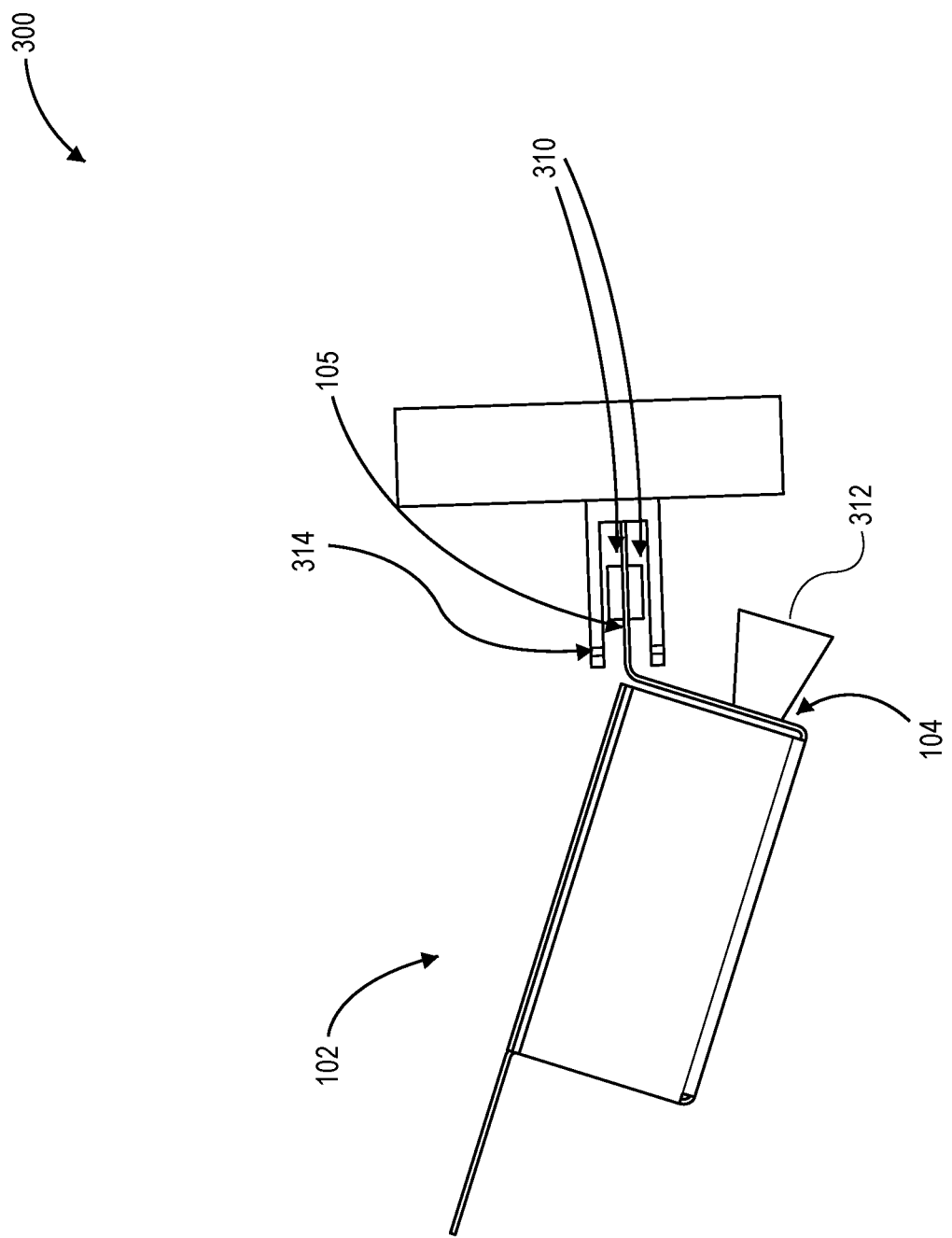
FIG. 3 is a schematic, side view diagram of a portion of another example container transport system, in accordance with implementations of the present disclosure.

FIG. 3 is a schematic, side view diagram 300 of a portion of another example container transport system, in accordance with implementations of the present disclosure.

As shown in FIG. 3, a portion of an example container transport, or container provisioning, system may include one or more pairs of transport belts 310, one or more guide surfaces 312, and/or one or more sensors 314. The example container provisioning system may receive, sort, divert, distribute, store, buffer, accumulate, dispense, transport, and/or provision one or more containers 102 between and among various portions of a material handling facility.

The container provisioning system illustrated in FIG. 3, including transport belts 310, guide surfaces 312, sensors 314, and/or other components, may include any and all of the features described herein at least with respect to FIGS. 2A and 2B. In addition, the example embodiment of FIG. 3 shows a different arrangement or configuration of the various components and containers of the container provisioning system.

In the example embodiment illustrated in FIG. 3, the pair of transport belts 310 may engage a flap 105 that is oriented toward a lateral side or side surface of the container provisioning system, and the flap 105 may form an angle that is other than 90 degrees with respect to an adjacent side surface 104 of the container 102. In addition, the guide surface 312 may contact and support a side surface 104 that is adjacent to and coupled to the flap 105 that is engaged by the pair of transport belts 310. Using this combination of engaged flap 105 and adjacent supported side surface 104, various types, sizes, or configurations of containers may be received, engaged, and transported by the container provisioning system.

For example, as long as the flap 105 has sufficient area or planar extent to be engaged by the pair of transport belts 310, different containers having various lengths and widths (e.g., defined as extending orthogonally within a plane that is substantially parallel with a plane of a base 103 of a container 102) may be engaged by the transport belts 310 and supported by the guide surface 312. In addition, as long as a portion of the side surface 104 contacts and is supported by the guide surface 312, different containers having various heights (e.g., defined as extending perpendicularly with respect to a plane of a base 103 of a container 102) may also be engaged by the transport belts 310 and supported by the guide surface 312. As a result, the container provisioning system described herein may occupy a smaller physical footprint than conventional conveyance mechanisms, and may also efficiently and effectively receive, engage, and transport various types or sizes of containers in an automated manner.

Figure 4:
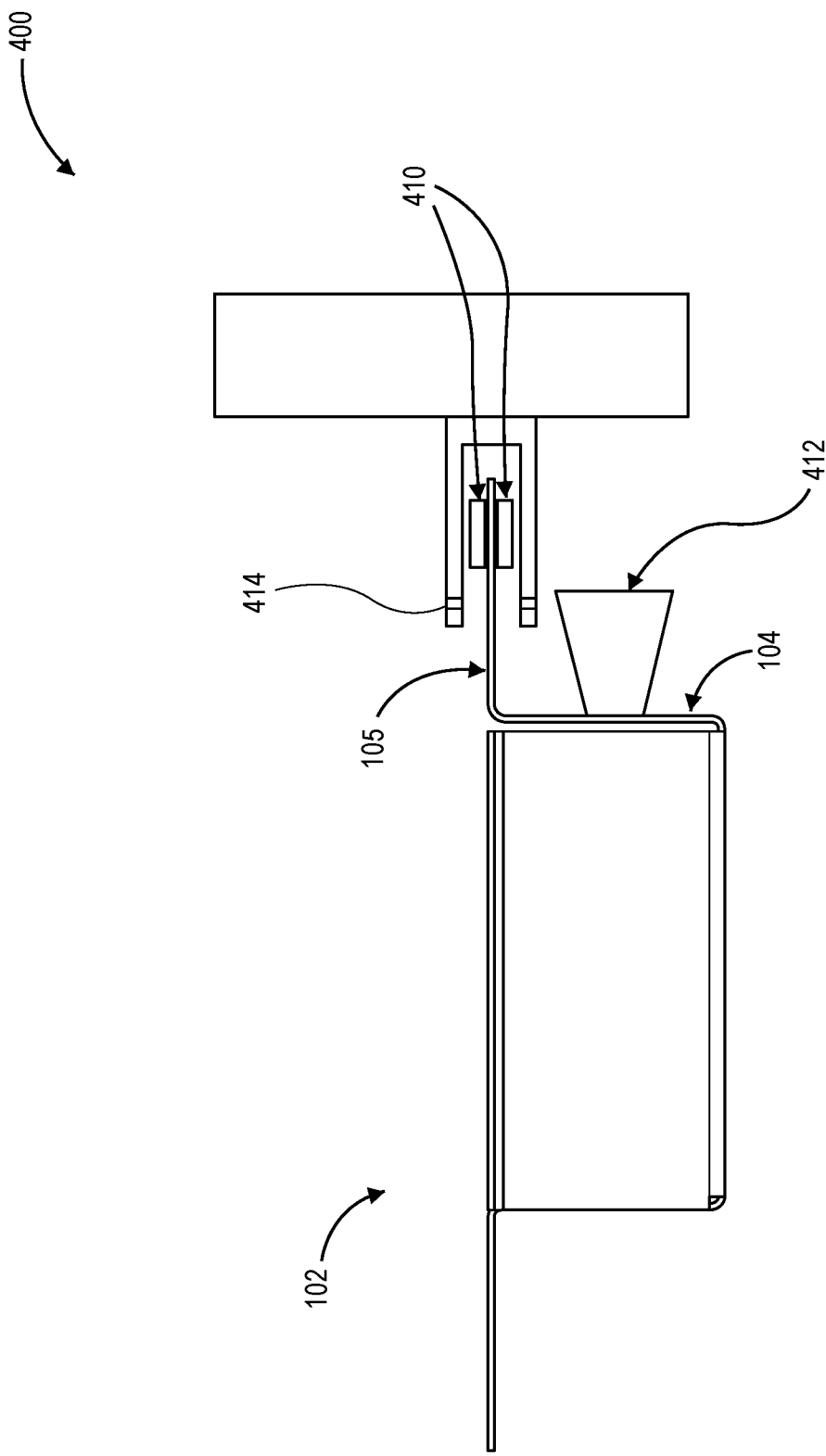
FIG. 4 is a schematic, side view diagram of a portion of yet another example container transport system, in accordance with implementations of the present disclosure.

FIG. 4 is a schematic, side view diagram 400 of a portion of yet another example container transport system, in accordance with implementations of the present disclosure.

As shown in FIG. 4, a portion of an example container transport, or container provisioning, system may include one or more pairs of transport belts 410, one or more guide surfaces 412, and/or one or more sensors 414. The example container provisioning system may receive, sort, divert, distribute, store, buffer, accumulate, dispense, transport, and/or provision one or more containers 102 between and among various portions of a material handling facility.

The container provisioning system illustrated in FIG. 4, including transport belts 410, guide surfaces 412, sensors 414, and/or other components, may include any and all of the features described herein at least with respect to FIGS. 2A and 2B. In addition, the example embodiment of FIG. 4 shows a different arrangement or configuration of the various components and containers of the container provisioning system.

In the example embodiment illustrated in FIG. 4, the pair of transport belts 410 may engage a flap 105 that is oriented toward a lateral side or side surface of the container provisioning system, and the flap 105 may form an angle that is substantially 90 degrees with respect to an adjacent side surface 104 of the container 102. In addition, the guide surface 412 may contact and support a side surface 104 that is adjacent to and coupled to the flap 105 that is engaged by the pair of transport belts 410. Using this combination of engaged flap 105 and adjacent supported side surface 104, various types, sizes, or configurations of containers may be received, engaged, and transported by the container provisioning system.

For example, as long as the flap 105 has sufficient area or planar extent to be engaged by the pair of transport belts 410, different containers having various lengths and widths (e.g., defined as extending orthogonally within a plane that is substantially parallel with a plane of a base 103 of a container 102) may be engaged by the transport belts 410 and supported by the guide surface 412. In addition, as long as a portion of the side surface 104 contacts and is supported by the guide surface 412, different containers having various heights (e.g., defined as extending perpendicularly with respect to a plane of a base 103 of a container 102) may also be engaged by the transport belts 410 and supported by the guide surface 412. As a result, the container provisioning system described herein may occupy a smaller physical footprint than conventional conveyance mechanisms, and may also efficiently and effectively receive, engage, and transport various types or sizes of containers in an automated manner.

Figure 5:
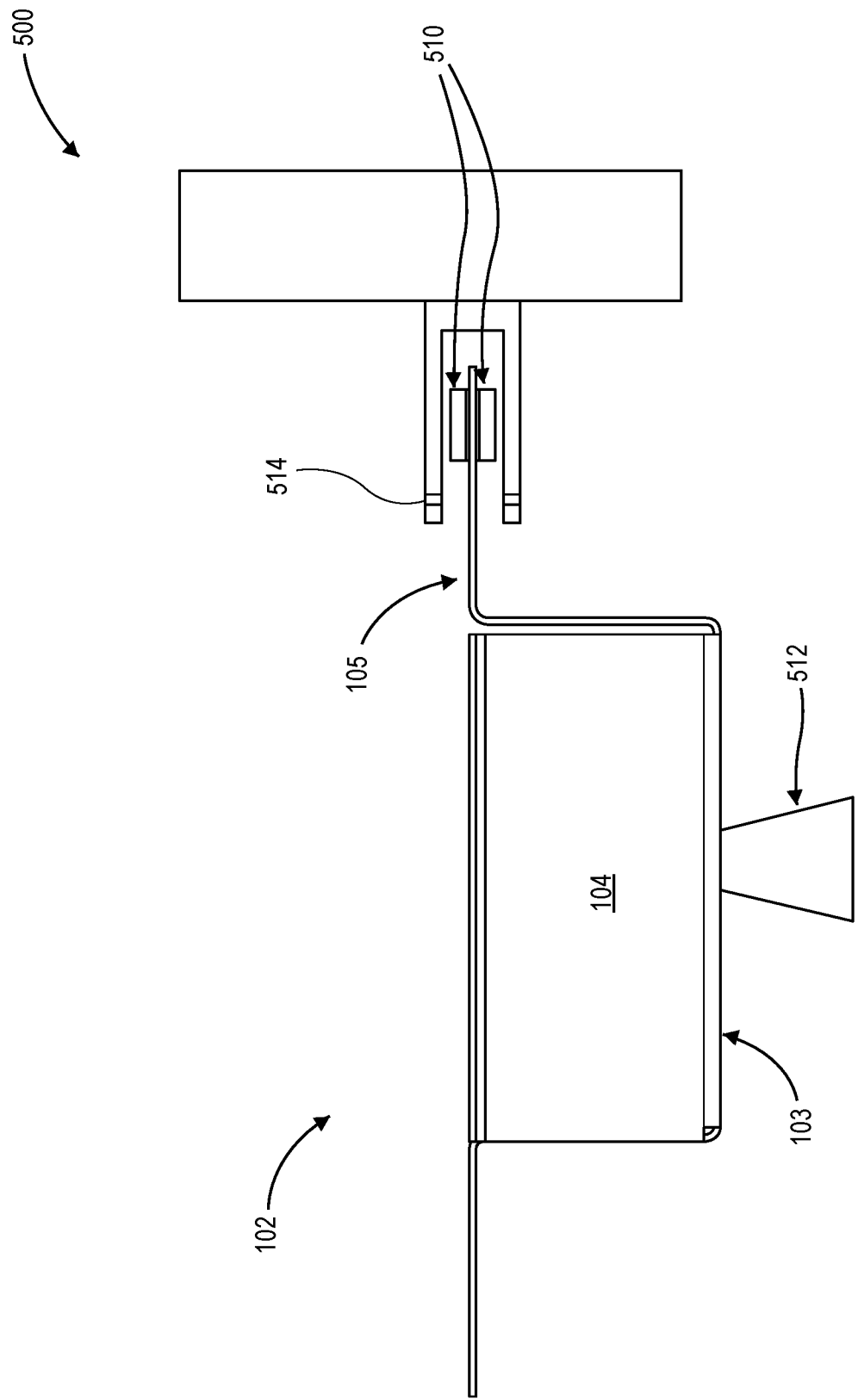
FIG. 5 is a schematic, side view diagram of a portion of a further example container transport system, in accordance with implementations of the present disclosure.

FIG. 5 is a schematic, side view diagram 500 of a portion of a further example container transport system, in accordance with implementations of the present disclosure.

As shown in FIG. 5, a portion of an example container transport, or container provisioning, system may include one or more pairs of transport belts 510, one or more guide surfaces 512, and/or one or more sensors 514. The example container provisioning system may receive, sort, divert, distribute, store, buffer, accumulate, dispense, transport, and/or provision one or more containers 102 between and among various portions of a material handling facility.

The container provisioning system illustrated in FIG. 5, including transport belts 510, guide surfaces 512, sensors 514, and/or other components, may include any and all of the features described herein at least with respect to FIGS. 2A and 2B. In addition, the example embodiment of FIG. 5 shows a different arrangement or configuration of the various components and containers of the container provisioning system.

In the example embodiment illustrated in FIG. 5, the pair of transport belts 510 may engage a flap 105 that is oriented toward a lateral side or side surface of the container provisioning system, and the flap 105 may form an angle that is substantially 90 degrees with respect to an adjacent side surface 104 of the container 102. In addition, the guide surface 512 may contact and support a base 103 of the container 102. Using this combination of engaged flap 105 and supported base 103, various types, sizes, or configurations of containers may be received, engaged, and transported by the container provisioning system.

For example, as long as the flap 105 has sufficient area or planar extent to be engaged by the pair of transport belts 510 and as long as a portion of the base 103 contacts and is supported by the guide surface 512, different containers having various lengths and widths (e.g., defined as extending orthogonally within a plane that is substantially parallel with a plane of a base 103 of a container 102) may be engaged by the transport belts 510 and supported by the guide surface 512. However, because the guide surface 512 contacts and supports a base 103 of the container 102, only a limited range of different containers having various heights (e.g., defined as extending perpendicularly with respect to a plane of a base 103 of a container 102) may also be engaged by the transport belts 510 and supported by the guide surface 512. In this example, however, supporting a base 103 of the container 102 by the guide surface 512 may provide or ensure a more stable and reliable configuration or orientation of the container 102 during transport by the transport belts 510. As a result, the container provisioning system described herein may occupy a smaller physical footprint than conventional conveyance mechanisms, and may also efficiently and effectively receive, engage, and transport various types or sizes of containers in an automated manner.

Figure 6:
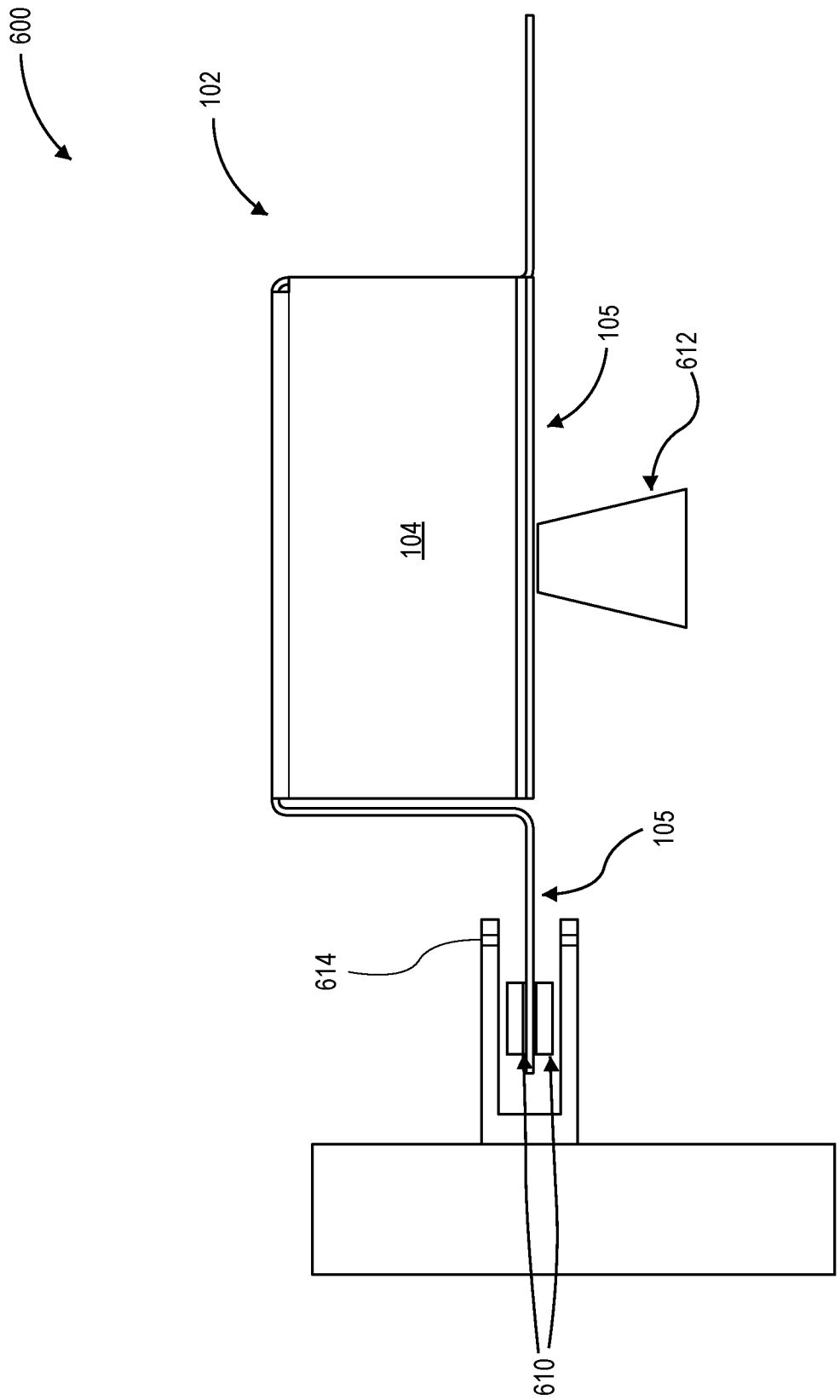
FIG. 6 is a schematic, side view diagram of a portion of a still further example container transport system, in accordance with implementations of the present disclosure.

FIG. 6 is a schematic, side view diagram 600 of a portion of a still further example container transport system, in accordance with implementations of the present disclosure.

As shown in FIG. 6, a portion of an example container transport, or container provisioning, system may include one or more pairs of transport belts 610, one or more guide surfaces 612, and/or one or more sensors 614. The example container provisioning system may receive, sort, divert, distribute, store, buffer, accumulate, dispense, transport, and/or provision one or more containers 102 between and among various portions of a material handling facility.

The container provisioning system illustrated in FIG. 6, including transport belts 610, guide surfaces 612, sensors 614, and/or other components, may include any and all of the features described herein at least with respect to FIGS. 2A and 2B. In addition, the example embodiment of FIG. 6 shows a different arrangement or configuration of the various components and containers of the container provisioning system.

In the example embodiment illustrated in FIG. 6, the pair of transport belts 610 may engage a flap 105 that is oriented toward a lateral side or side surface of the container provisioning system, and the flap 105 may form an angle that is substantially 90 degrees with respect to an adjacent side surface 104 of the container 102. In addition, the guide surface 612 may contact and support one or more additional flaps 105 of the container 102 as it is transported in an inverted or upside down orientation. Using this combination of engaged flap 105 and supported additional flaps 105, various types, sizes, or configurations of containers may be received, engaged, and transported by the container provisioning system.

For example, as long as the flap 105 has sufficient area or planar extent to be engaged by the pair of transport belts 610 and as long as a portion of the additional flaps 105 contact and are supported by the guide surface 612, different containers having various lengths and widths (e.g., defined as extending orthogonally within a plane that is substantially parallel with a plane of a base 103 of a container 102) may be engaged by the transport belts 610 and supported by the guide surface 612. In addition, as long as a portion of the additional flaps 105 contact and are supported by the guide surface 612, different containers having various heights (e.g., defined as extending perpendicularly with respect to a plane of a base 103 of a container 102) may also be engaged by the transport belts 610 and supported by the guide surface 612. Further with respect to this example, supporting additional flaps 105 of the container 102 by the guide surface 612 may provide or ensure a more stable and reliable configuration or orientation of the container 102 during transport by the transport belts 610, while also allowing transport of containers 102 having various heights. As a result, the container provisioning system described herein may occupy a smaller physical footprint than conventional conveyance mechanisms, and may also efficiently and effectively receive, engage, and transport various types or sizes of containers in an automated manner.

Although FIGS. 2A-6 illustrate various example embodiments of a container provisioning system having different arrangements or configurations of the various components, other example embodiments may include various other arrangements or configurations of the various components to receive, engage, and transport containers within a material handling facility. Further, a container provisioning system may have various combinations of different arrangements or configurations, such that different portions of a container provisioning system within a material handling facility may have different arrangements or configurations, as shown and described by the examples herein or according to other example embodiments, at different points or positions of transport within the facility.

Figure 7A:
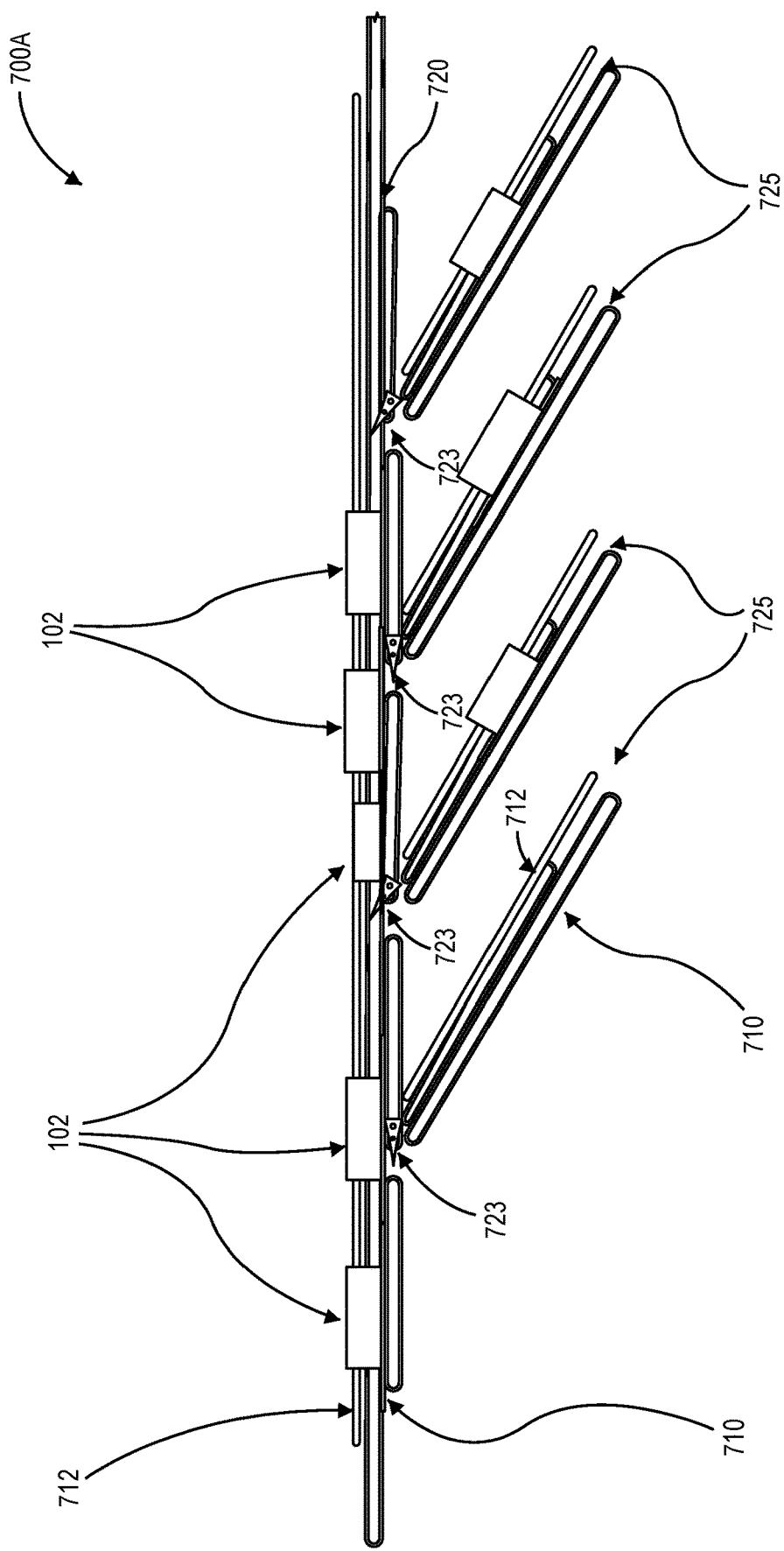
FIG. 7A is a schematic, top view diagram of a portion of an example container sortation system, in accordance with implementations of the present disclosure.
Figure 7B:
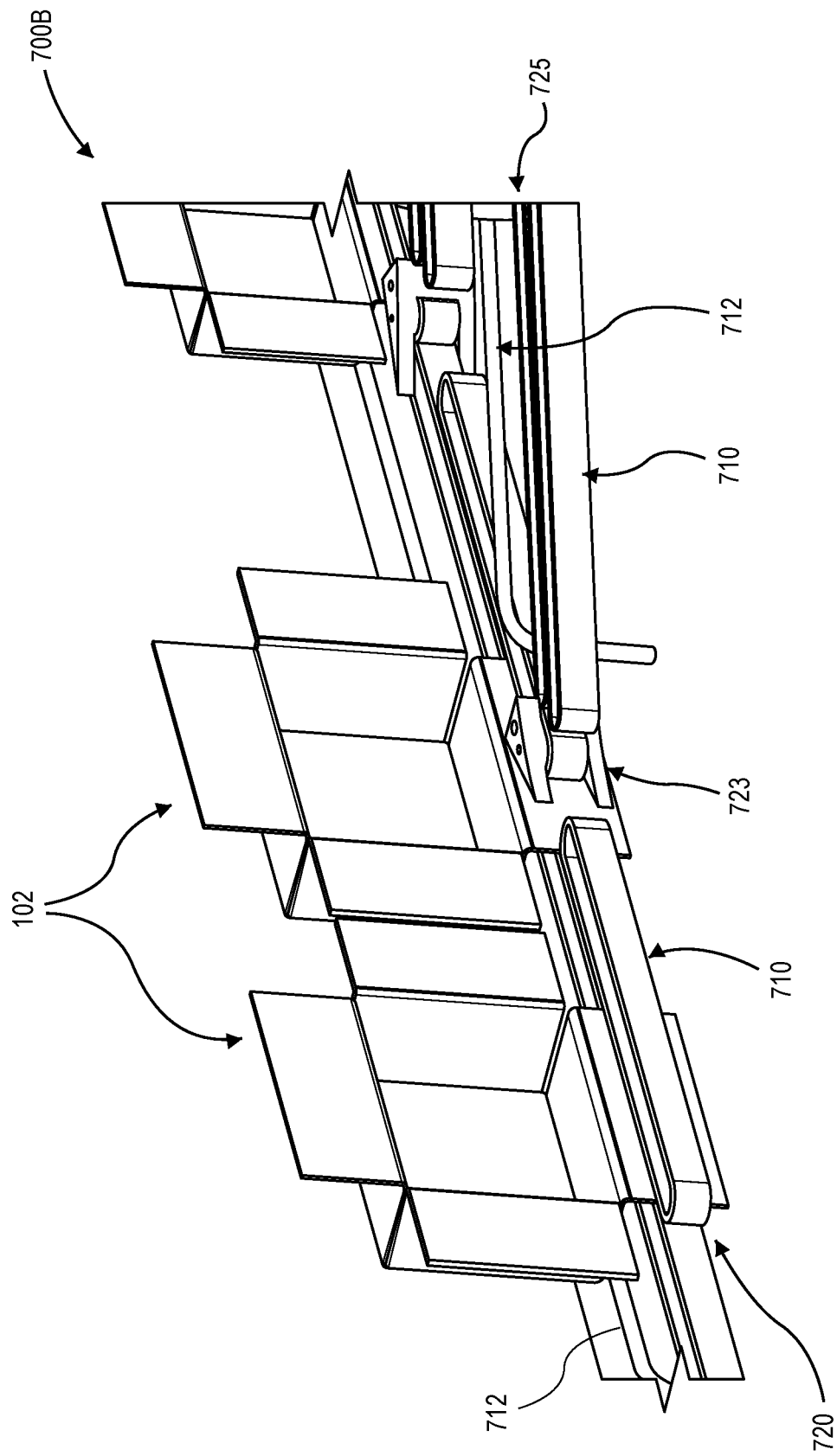
FIG. 7B is a schematic, perspective view diagram of a portion of the example container sortation system of FIG. 7A, in accordance with implementations of the present disclosure.

FIG. 7A is a schematic, top view diagram 700A of a portion of an example container sortation system, in accordance with implementations of the present disclosure, and FIG. 7B is a schematic, perspective view diagram 700B of a portion of the example container sortation system of FIG. 7A, in accordance with implementations of the present disclosure.

As shown in FIGS. 7A and 7B, a portion of an example container sortation system, which may form a portion of a container transport or provisioning system, may include a main transport path 720, one or more gates 723, and one or more divert, secondary, or auxiliary transport paths 725. In addition, each of the main transport path 720 and divert transport paths 725 may include associated one or more pairs of transport belts 710, one or more guide surfaces 712, one or more sensors, and/or other components described herein with respect to container transport or provisioning systems.

The container sortation system illustrated in FIGS. 7A and 7B, including main or divert transport paths 720, 725, transport belts 710, guide surfaces 712, gates 723, sensors, and/or other components, may include any and all of the features described herein at least with respect to FIGS. 2A-6. In addition, the example embodiment of FIGS. 7A and 7B shows a particular arrangement or configuration of the various components and containers of the container sortation system.

One or more containers 102 may be transported along the main transport path 720 via engagement of portions of the containers 102 with the transport belts 710 as well as support of portions of the containers 102 by the guide surfaces 712. In example embodiments, one or more sensors associated with the container sortation system may detect a particular container, as described herein with respect to various types of sensors, and it may be determined to cause the container to divert from a main transport path 720 to a divert transport path 725 based on data associated with the container, e.g., a size, a type, an identity, current or expected contents, a destination or downstream station, or other detected aspects or characteristics. If it is determined to divert, sort, or route a particular container from the main transport path 720 to a divert transport path 725, a gate 723 associated with the divert transport path 725 may be actuated to cause the container to exit the main transport path 720 and enter the divert transport path 725.

The gates 723 may comprise various types of actuatable or movable components to cause a container 102 to follow a particular path, whether the main transport path 720 or one or more divert transport paths 725. Example gates 723 may comprise switch gates, leading edge gates, channel gates, or various other types of gates. In addition, various types of actuators may be operatively coupled to the gates in order to actuate the gates, such as solenoids, servos, motors, rotary actuators, linear actuators, geared actuators, pneumatic or hydraulic actuators, or other types of actuators.

During the transition of a container from the main transport path 720 to a divert transport path 725, the portion of the container 102 that is engaged by transport belts 710 associated with the main transport path 720 may be released, disengaged, or removed from such transport belts 710, and the portion of the container 102 may then be received or engaged by transport belts 710 associated with the divert transport path 725. In similar manner, the portion of the container 102 that is supported by a guide surface 712 associated with the main transport path 720 may cease being supported by such guide surface 712, and the portion of the container 102 may then be supported by a guide surface 712 associated with the divert transport path 725.

In example embodiments, a container 102 may generally be continuously engaged with at least one pair of transport belts 710, whether associated with the main transport path 720 or a divert transport path 725. In addition, in some example embodiments, a container 102 may be continuously supported by at least one guide surface 712, whether associated with the main transport path 720 or a divert transport path 725. In other example embodiments, a container 102 may be discontinuously or intermittently supported by at least one guide surface 712, whether associated with the main transport path 720 or a divert transport path 725, such that there may be portions of movement or transport of the container 102 during which the container 102 may only be engaged by transport belts 710 but not supported by a guide surface 712. In some examples, the guide surfaces 712 may include ends, edges, ramps, angles, or other sloped, angled, or curved features to facilitate ceasing and/or initiating support of portions of the container 102 during transport.

In further example embodiments, one or more transport belts 710 and/or one or more guide surfaces 712 may also be actuated, with or without the use of gates 723, in order to divert a container from a main transport path 720 to one or more divert transport paths 725. For example, various types of actuators may be operatively coupled to the transport belts 710 in order to actuate or move the belts 710, such as solenoids, servos, motors, rotary actuators, linear actuators, geared actuators, pneumatic or hydraulic actuators, or other types of actuators. The actuation or movement of the transport belts 710 may cause a container to continue along a desired or determined path, e.g., transition to transport belts 710 associated with a divert transport path 725. Alternatively or in addition, various types of actuators may be operatively coupled to the guide surfaces 712 in order to actuate or move the guide surfaces 712, such as solenoids, servos, motors, rotary actuators, linear actuators, geared actuators, pneumatic or hydraulic actuators, or other types of actuators. The actuation or movement of the guide surfaces 712 may facilitate contact and support of a container as it continues along a desired or determined path, e.g., transition to guide surfaces 712 associated with a divert transport path 725.

As a result, the container sortation system described herein at least with respect to FIGS. 7A and 7B may enable diverting and sortation of containers to particular determined or desired destinations, e.g., downstream stations or processes.

Although FIGS. 7A and 7B illustrate a particular number, type, arrangement, or configuration of components of a container sortation system, other example embodiments may include various other numbers, types, arrangements, or configurations of the various components to divert or sort containers to determined or desired downstream stations or processes within a material handling facility. For example, a material handling facility may have multiple main transport paths, may have multiple divert transport paths associated with individual gates along a main transport path, may have additional divert transport paths along one or more initial divert transport paths, and/or may have various other arrangements or configurations of transport paths that lead to associated destinations, e.g., downstream stations or processes.

FIG. 8 is a schematic, side view diagram 800 of a portion of another example container transport system, in accordance with implementations of the present disclosure.

As shown in FIG. 8, a portion of an example container transport, or container provisioning, system may include one or more pairs of transport belts 810, one or more guide surfaces 812, and/or one or more sensors 814. The example container provisioning system may receive, sort, divert, distribute, store, buffer, accumulate, dispense, transport, and/or provision one or more containers 102 between and among various portions of a material handling facility.

The container provisioning system illustrated in FIG. 8, including transport belts 810, guide surfaces 812, sensors 814, and/or other components, may include any and all of the features described herein at least with respect to FIGS. 2A-6. In addition, the example embodiment of FIG. 8 shows additional components 830 that are positioned, arranged, oriented, or configured to perform additional operations with respect to containers 102 during transport of the containers 102 within a material handling facility.

The additional components 830 may comprise printers, inkjet printers, label printers, label applicators, item packing devices, item picking devices, automated machinery or equipment, robotic arms or systems, one or more additional sensors, cameras, or scanners, and/or other types of additional components. In example embodiments, the additional components 830 may perform various types of operations with respect to containers 102 during transport by the container transport system, such as printing onto a surface of the container, printing and/or applying a label to a surface of the container, packing an item into a container, picking an item from a container, identifying, counting, or tracking a container, capturing imaging or scanning data of a container and/or contents thereof, or other types of operations.

One or more containers 102 may be transported via engagement of portions of the containers 102 with the transport belts 810 as well as support of portions of the containers 102 by the guide surfaces 812. In example embodiments, one or more sensors associated with the container provisioning system may detect a particular container, as described herein with respect to various types of sensors, and it may be determined to perform an additional operation with respect to the container during transport based on data associated with the container, e.g., a size, a type, an identity, current or expected contents, a destination or downstream station, or other detected aspects or characteristics. If it is determined to perform an additional operation with respect to a particular container, an additional component 830 may be instructed to perform the additional operation during transport of the container by the container provisioning system.

As a result, the container transport or provisioning system described herein at least with respect to FIG. 8 may enable performance or completion of various additional operations, e.g., printing, labeling, scanning, imaging, identifying, counting, tracking, packing, picking, or others, during transport of containers within a material handling facility.

Although FIG. 8 illustrates a particular number, type, arrangement, or configuration of components of a container provisioning system, other example embodiments may include various other numbers, types, arrangements, or configurations of the various components to perform additional operations with respect to containers during transport within a material handling facility. For example, multiple additional operations may be performed simultaneously or at least partially concurrently with respect to a container. In addition, the additional components may be positioned, arranged, or oriented at different positions relative to containers in order to perform respective additional operations.

Figure 9:
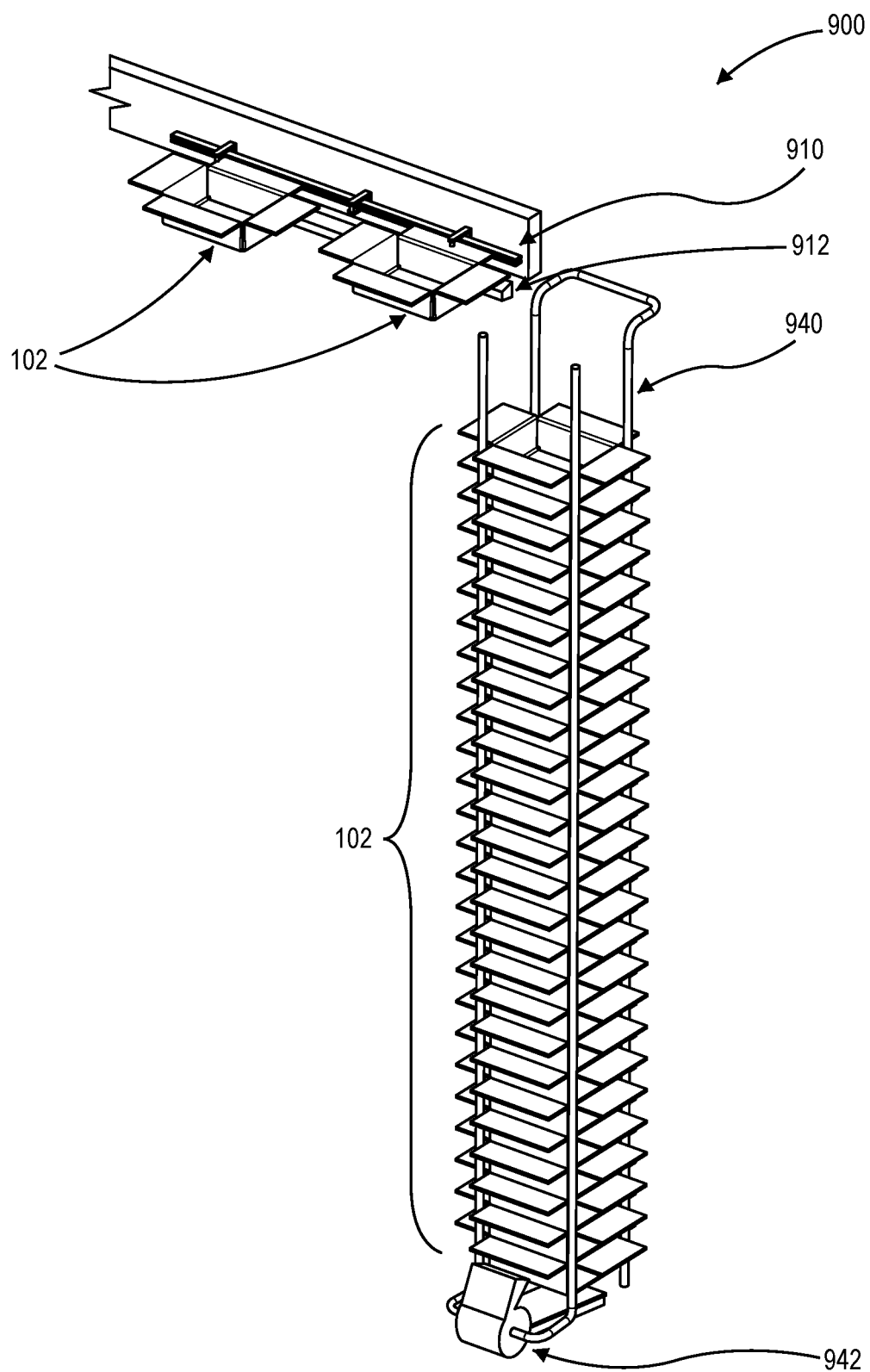
FIG. 9 is a schematic, perspective view diagram of a portion of an example container accumulation system, in accordance with implementations of the present disclosure.

FIG. 9 is a schematic, perspective view diagram 900 of a portion of an example container accumulation system, in accordance with implementations of the present disclosure.

As shown in FIG. 9, a portion of an example container accumulation system, which may form a portion of a container transport or provisioning system, may include one or more pairs of transport belts 910, one or more guide surfaces 912, and/or one or more sensors. The example container accumulation system, as part of the container provisioning system, may receive, sort, divert, distribute, store, buffer, accumulate, dispense, transport, and/or provision one or more containers 102 between and among various portions of a material handling facility.

The container accumulation system illustrated in FIG. 9, including transport belts 910, guide surfaces 912, sensors, and/or other components, may include any and all of the features described herein at least with respect to FIGS. 2A-6 and 8. In addition, the example embodiment of FIG. 9 shows an accumulation magazine 940 and container dispensing device 942 that are positioned, arranged, oriented, or configured to receive, store, buffer, and accumulate containers 102, and also release, dispense, or provision containers 102 to downstream stations or processes within a material handling facility.

The accumulation magazine 940 may comprise bars, guides, beams, poles, or other structures configured to receive containers 102 that have been transported and released from transport belts 910 and guide surfaces 912 of a container transport system. In some example embodiments, the containers 102 may be released and fall, slide, and accumulate within the accumulation magazine 940 due to gravity. In addition, the container dispensing device 942 may move, push, pull, or otherwise remove containers 102, e.g., one container at a time, from the accumulation magazine 940 to one or more downstream stations or processes. For example, the container dispensing device 942 may comprise one or more actuators, such as solenoids, servos, motors, rotary actuators, linear actuators, or other types of actuators, to remove or eject containers 102 from the accumulation magazine 940. In addition, the removed or ejected containers 102 may be further transported to downstream stations or processes via conveyors, slides, chutes, autonomous vehicles, human associates, and/or other portions of the container provisioning system as described herein.

One or more containers 102 may be transported via engagement of portions of the containers 102 with the transport belts 910 as well as support of portions of the containers 102 by the guide surfaces 912. In example embodiments, one or more sensors associated with the container provisioning system may detect a particular container, as described herein with respect to various types of sensors, and it may be determined to release, store, or buffer the container within an accumulation magazine during transport based on data associated with the container, e.g., a size, a type, an identity, current or expected contents, a destination or downstream station, or other detected aspects or characteristics. If it is determined to store or buffer the container, the container may be routed to the accumulation magazine 940, released and stored in the accumulation magazine 940, and then later removed or ejected from the accumulation magazine 940 by a container dispensing device 942 as desired or determined for one or more downstream stations or processes.

In some example embodiments, in order to release a container into the accumulation magazine 940, spacing, tension, and/or force associated with the transport belts may be modified in order to disengage and release the flap or other portion of the container from the transport belts. In other example embodiments, in order to release a container into the accumulation magazine 940, a container may be diverted and released from the transport belts, e.g., using one or more gates as described herein. In addition, the released container may slide, move, or fall along one or more slides, chutes, guides, tracks, rollers, or other components to a position within the accumulation magazine. Further, one or more active components, such as conveyors, belts, rollers, arms, robots, or other devices, may facilitate movement of the container to a position within the accumulation magazine.

As a result, the container accumulation system described herein at least with respect to FIG. 9 may enable storage, buffering, and/or accumulation of containers at various points or portions within a material handling facility, e.g., immediately prior to use of the containers at a downstream station or process, at an intermediate transport point within a material handling facility, and/or at various other points or portions of container transport or provisioning within a material handling facility.

Although FIG. 9 illustrates a particular number, type, arrangement, or configuration of components of a container accumulation system, other example embodiments may include various other numbers, types, arrangements, or configurations of the various components to store, buffer, or accumulate containers during transport within a material handling facility. For example, a single accumulation magazine may receive multiple different types or sizes of containers, multiple accumulation magazines may receive different types or sizes of containers, accumulation magazines may receive various numbers of containers, a single accumulation magazine may be associated with multiple container dispensing devices, multiple accumulation magazines may be associated with a single container dispensing device, and/or various other arrangements or configurations.

In other example embodiments, the container provisioning system described herein may transport and provision containers to determined or desired downstream station or processes substantially as needed or required at such stations or processes. For example, based on determined need for particular containers in a particular sequence at a downstream station, e.g., a packing station, one or more containers may be sorted, sequenced, routed, transported, and provisioned to the downstream station in the particular sequence to support operations at the downstream station. This sorting, sequencing, and transport of containers in determined sequences to downstream stations may be performed in addition to, or alternatively to, accumulation of one or more containers at container accumulation stations as described herein.

Figure 10:
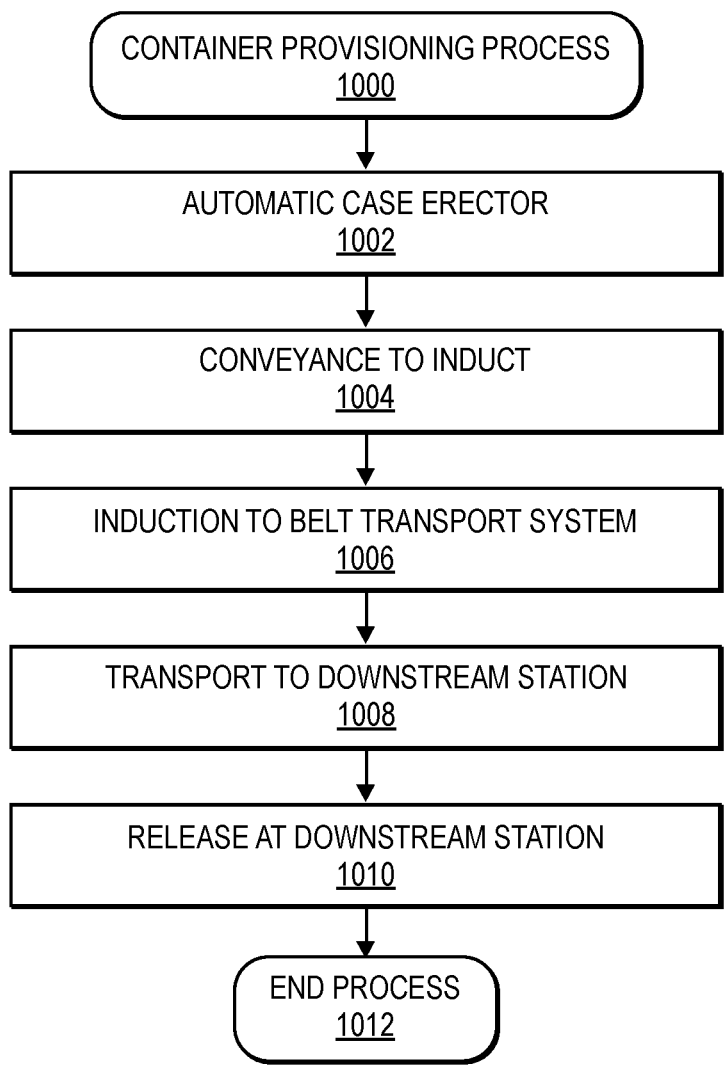
FIG. 10 is a flow diagram illustrating an example container provisioning process, in accordance with implementations of the present disclosure.

FIG. 10 is a flow diagram illustrating an example container provisioning process 1000, in accordance with implementations of the present disclosure.

The process 1000 may begin at an automatic case erector, as at 1002. For example, one or more blanks, or other forms of packaged, flattened, or unassembled containers, may be transported or provisioned to an automatic case erector. The automatic case erector may at least partially erect or assemble containers from the blanks, or other forms of packaged, flattened, or unassembled containers. In example embodiments, the automatic case erector may at least partially erect the blanks into boxes having respective bases, side surfaces, and one or more flaps. In other example embodiments, the automatic case erector may at least partially erect or assemble bins, totes, or other types of containers having respective bases, side surfaces, and one or more flaps, flanges, surfaces, extensions, wings, lids, or covers. Further, a controller may instruct or command one or more automatic case erectors to at least partially erect or assemble boxes, bins, totes, or other containers.

The process 1000 may continue with conveyance to induct, as at 1004. For example, one or more conveyance mechanisms, e.g., conveyors, belts, rollers, wheels, slides, chutes, robotic arms or devices, automated vehicles, carts, human associates, or other machinery or equipment, may be used to transfer or transport the partially erected or assembled containers from the automatic case erectors for induction into a container transport or provisioning system as described herein. For example, the conveyance mechanisms may align at least one flap or other portion of the containers in order to be received and engaged by one or more pairs of transport belts of a container provisioning system. In addition, the conveyance mechanisms may align one or more of a base, side surfaces, or other flaps or portions of the containers in order to be contacted and supported by one or more guide surfaces of the container provisioning system. Further, a controller may instruct or command one or more conveyance mechanisms to transfer or transport containers for induction into a container provisioning system.

The process 1000 may then proceed to induction to the belt transport system, as at 1006. For example, one or more pairs of transport belts of a container transport or provisioning system may receive and engage flaps or other portions of containers to be transported within a material handling facility. In some examples, a pair of transport belts may be positioned proximate opposite faces, surfaces, or sides of a flap or other portion of a container with a first distance between the pair of transport belts in order to receive the flap or other portion, and the pair of transport belts may gradually reduce the distance therebetween to a second distance between the pair of transport belts at which the transport belts may engage the flap or other portion of the container with a determined or desired amount of friction. Further, a guide surface may be positioned proximate a base, side surface, or flap or other portion of the container at a first distance from the portion of the container, and the guide surface may gradually reduce the distance from the portion of the container to a second distance at which the guide surface may contact and support the portion of the container. In this manner, a pair of transport belts may receive and engage a flap or other portion of a container, and a guide surface may contact and support a portion of the container, in order to then transport and provision the container to one or more downstream stations or processes. Further, a controller may instruct or command engagement of a portion of the container by the transport belts, and support of a portion of the container by the guide surface, in order to transport and provision the container within a material handling facility.

The process 1000 may continue with transport to a downstream station, as at 1008. For example, the container transport or provisioning system, responsive to having engaged and supported one or more containers by one or more transport belts and guide surfaces, may then transfer, sort, sequence, divert, distribute, store, buffer, accumulate, dispense, transport, and/or provision the containers to various determined or desired downstream stations or processes. As described herein, various additional operations may be performed with respect to the containers during transport, including diverting, sorting, printing, labeling, scanning, imaging, identifying, counting, tracking, packing, picking, accumulating, buffering, storing, dispensing, or other operations. Further, a controller may instruct or command transport of containers to downstream stations within a material handling facility.

The process 1000 may proceed to release at a downstream station, as at 1010. For example, the container transport or provisioning system may release one or more containers from the one or more transport belts and guide surfaces at various downstream stations or processes. In some examples, the downstream stations or processes may comprise packing stations, picking stations, buffer or storage areas, accumulation systems, shipping areas, recycling or disposal areas, or other stations, areas, or processes. Further, a controller may instruct or command release of containers at downstream stations within a material handling facility.

The process 1000 may then end, as at 1012.

Figure 11:
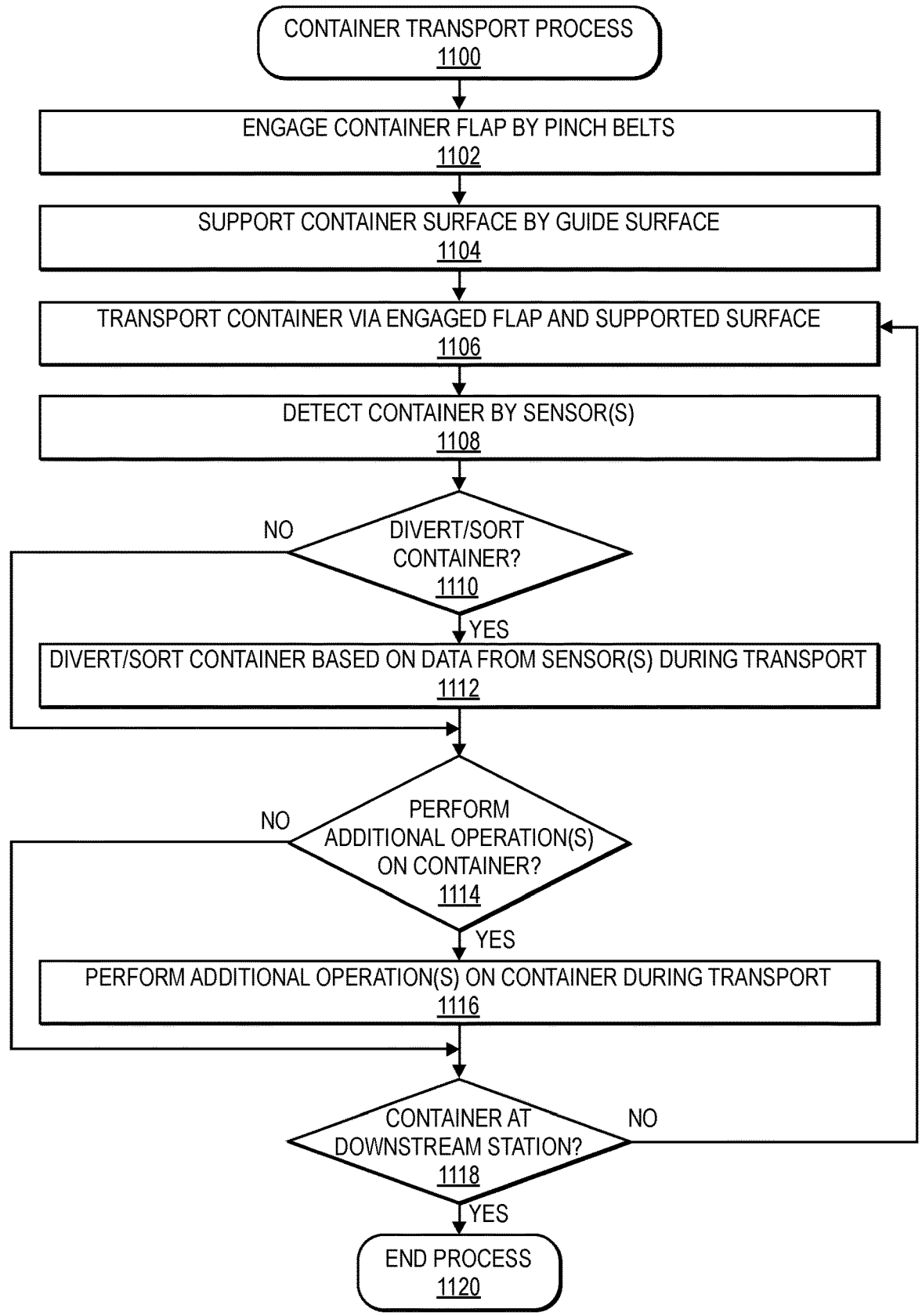
FIG. 11 is a flow diagram illustrating an example container transport process, in accordance with implementations of the present disclosure.

FIG. 11 is a flow diagram illustrating an example container transport process 1100, in accordance with implementations of the present disclosure.

The process 1100 may begin by engaging a container flap by pinch belts, as at 1102. For example, as described herein, a container may be inducted into a container transport or provisioning system such that a flap or other portion of the container is received and engaged by a pair of transport belts. The transport belts may engage and apply a determined or desired amount of friction in order to reliably grip and cause movement of the container responsive to movement of the transport belts. Further, a controller may instruct or command induction and engagement of a container by transport belts of a container provisioning system.

The process 1100 may continue by supporting a container surface by a guide surface, as at 1104. For example, as described herein, a container may be inducted into a container transport or provisioning system such that a base, surface, flap, or other portion of the container is contacted and supported by at least one guide surface. The guide surfaces may contact, support, and enable controlled movement, e.g., sliding, rolling, or other movement, of the container responsive to movement of the transport belts. Further, a controller may instruct or command contact and support of a container by guide surfaces of a container provisioning system.

The process 1100 may proceed by transporting a container via the engaged flap and supported surface, as at 1106. For example, as described herein, responsive to engaging a portion of a container by transport belts, and responsive to supporting a portion of the container by at least one guide surface, the container transport or provisioning system may transport the container to a downstream station or process. One or more actuators or motors associated with the transport belts may drive the transport belts, such that the container is moved or transported responsive to movement of the transport belts. Further, a controller may instruct or command transport of a container by a container provisioning system.

The process 1100 may then continue to detect a container by one or more sensors, as at 1108. For example, one or more sensors associated with the container provisioning system may detect the container during transport within a material handling facility. As described herein, various types of sensors may be used to detect various aspects or characteristics of the container, such as photoeyes, discrete counters, presence detection sensors, proximity sensors, imaging devices, scanning devices, encoders, optical surface speed detection sensors, or other types of sensors. In some examples, the one or more sensors may detect or identify the container, track a position or movement of the container, determine a position, speed, or direction of travel of the container, and/or detect other aspects or characteristics of the container and/or its movement. Further, a controller may instruct or command detection of containers by sensors during transport by the container provisioning system.

The process 1100 may then proceed to determine whether to divert or sort the container, as at 1110. For example, based on detection, identification, and/or tracking of the container during transport, it may be determined whether to divert or sort the container from, between, or among one or more transport paths, e.g., one or more main transport paths, divert transport paths, or other transport paths, of the container provisioning system. In some examples, based on a determined destination or downstream station or process, it may be determined to divert or sort the container among various transport paths in order to provision the container to the downstream station. Various other factors may also be considered in order to determine whether to divert or sort the container, such as congestion, breakdowns, or other issues along one or more transport paths, availability of similar or different containers within the container provisioning system, expected time duration to transport the container to the downstream station, determined or desired time at which to provision the container at the downstream station, and/or other factors. Further, a controller may determine whether to divert or sort a container.

If it is determined to divert or sort a container, the process 1100 may then continue with diverting the container based on data from the one or more sensors during transport, as at 1112. For example, upon detecting the container at a desired divert or sort point of a container sortation system as described herein, the container may be diverted between or among various transport paths in order to provision the container to a determined downstream station. In some examples, one or more gates or other actuators may cause transfer or transition of the container between or among various transport paths. Further, the container may transfer or transition between various pairs of transport belts and/or various guide surfaces as part of the diversion or sortation toward the determined downstream station. Moreover, multiple such transfers or transitions may be required in order to provision the container to a determined downstream station. Further, a controller may instruct diversion or sortation of the container.

The process 1100 may then proceed with determining whether any additional operations are to be performed on the container, as at 1114. For example, based on detection, identification, and/or tracking of the container during transport, it may be determined whether to perform one or more additional operations with respect to the container during transport, such as printing, labeling, scanning, imaging, identifying, counting, tracking, packing, picking, accumulating, buffering, storing, dispensing, or other operations. In some examples, based on a determined destination or downstream station or process, it may be determined to print or label a container during transport, and/or accumulate, store, or buffer the container at a particular position of the container provisioning system. In addition, based on current or expected contents of the container, it may be determined to print or label the container, and/or scan, image, identify, count, pack, or pick items associated with the container during transport. Various other factors may also be considered in order to determine whether to perform any additional operations with respect to the container. Further, a controller may determine whether to perform additional operations on a container during transport.

If it is determined to perform additional operations on a container, the process 1100 may continue by performing one or more additional operations on the container during transport, as at 1116. For example, upon detecting the container proximate a position or location of the container provisioning system at which an additional operation may be performed, the additional operation may be instructed at the position or location. Various devices, machines, equipment, or associates may be instructed to perform the one or more additional operations, such as printers, label applicators, scanning devices, imaging devices, robotic or automated machinery, human associates, or other types of systems, machinery, or devices. Moreover, multiple additional operations may be performed on a container during transport to a determined downstream station. Further, a controller may instruct performance of additional operations on the container.

The process 1100 may then proceed by determining whether the container is at the downstream station, as at 1118. For example, one or more sensors may detect, identify, and/or track a container to determine whether the container has been provisioned to a determined downstream station or process. In some examples, the downstream station or process may comprise a packing station, picking station, buffer or storage area, accumulation system, shipping area, recycling or disposal area, or other station, area, or process. Further, a controller may determine whether the container has been provisioned to a downstream station.

If it is determined that the container has not yet been provisioned to a determined downstream station or process by the container provisioning system, the process 1100 may return to step 1106 to continue to transport the container by the container provisioning system, as well as divert or sort, and/or perform additional operations with respect to the container. If, however, it is determined that the container has been provisioned to a determined downstream station or process by the container provisioning system, the process 1100 may then end, as at 1120.

Figure 12:
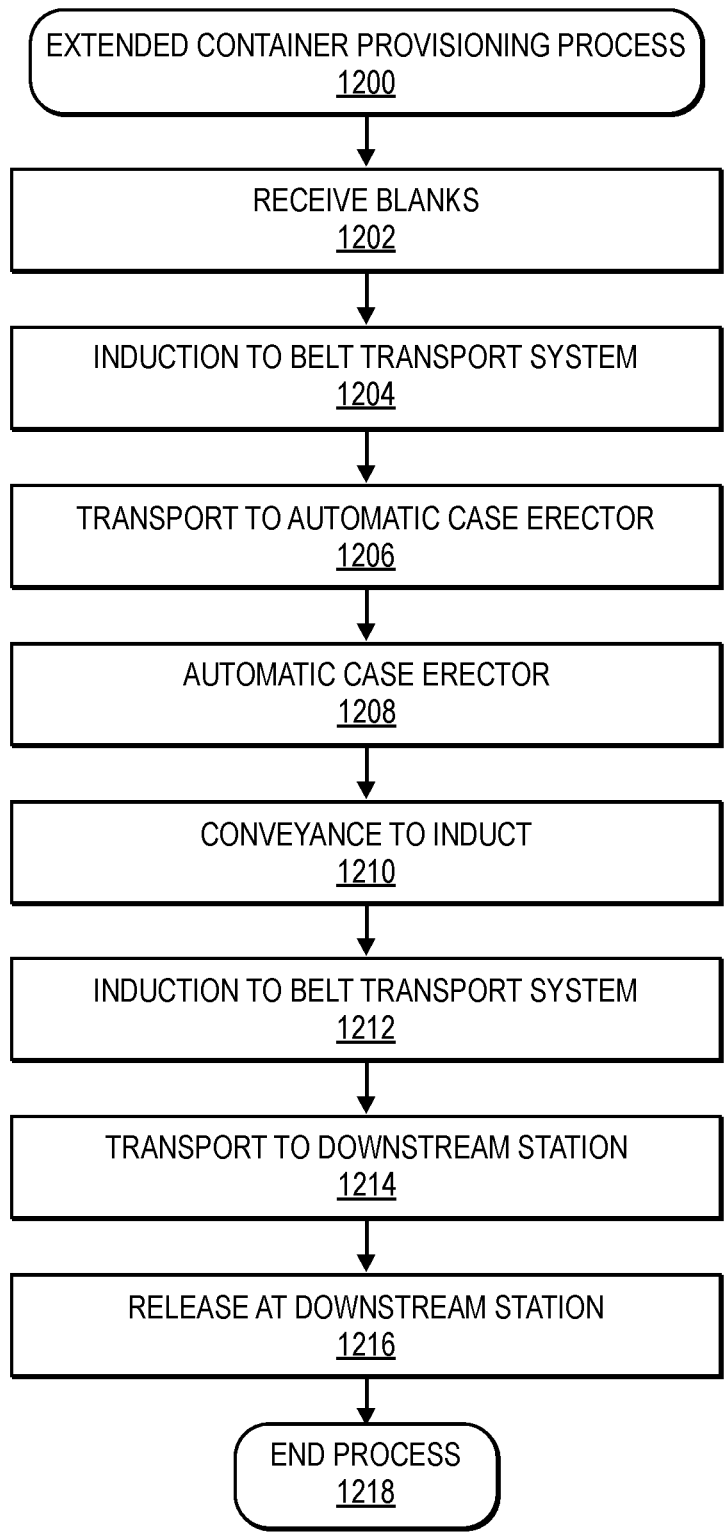
FIG. 12 is a flow diagram illustrating an example extended container provisioning process, in accordance with implementations of the present disclosure.

FIG. 12 is a flow diagram illustrating an example extended container provisioning process 1200, in accordance with implementations of the present disclosure.

The process 1200 may begin by receiving blanks, as at 1202. For example, one or more blanks, or other forms of packaged, flattened, or unassembled containers, may be received at a portion of a material handling facility, e.g., a receive station or area of the facility. Generally, the blanks or other forms of containers may be substantially flat, unerected, or unassembled. Further, a controller may receive the blanks or other forms of containers within the material handling facility.

The process 1200 may continue to induction to the belt transport system, as at 1204. For example, one or more pairs of transport belts of a container transport or provisioning system may receive and engage portions of the blanks or other forms of containers to be transported to one or more automatic case erectors. In some examples, a pair of transport belts may be positioned proximate opposite faces, surfaces, or sides of the blanks or other forms of containers with a first distance between the pair of transport belts in order to receive the blanks or other forms of containers, and the pair of transport belts may gradually reduce the distance therebetween to a second distance between the pair of transport belts at which the transport belts may engage the blanks or other forms of containers with a determined or desired amount of friction. Further, one or more guide surfaces may be positioned proximate portions of the blanks or other forms of containers at a first distance from the portions of the blanks or other forms of containers, and the guide surfaces may gradually reduce the distance from the portions of the blanks or other forms of containers to a second distance at which the guide surfaces may contact and support the portions of the blanks or other forms of containers. In this manner, a pair of transport belts may receive and engage the blanks or other forms of containers, and guide surfaces may contact and support portions of the blanks or other forms of containers, in order to then transport and provision the blanks or other forms of containers to one or more automatic case erectors. In other examples, guide surfaces may not be used or needed to support portions of the blanks or other forms of containers that are engaged by transport belts. Further, a controller may instruct or command engagement of the blanks or other forms of containers by the transport belts, and support of portions of the blanks or other forms of containers by the guide surfaces, in order to transport and provision the blanks or other forms of containers within a material handling facility.

The process 1200 may proceed with transport to an automatic case erector, as at 1206. For example, the container transport or provisioning system, responsive to having engaged and supported one or more blanks or other forms of containers by one or more transport belts and/or guide surfaces, may then transfer, sort, sequence, divert, distribute, store, buffer, accumulate, dispense, transport, and/or provision the blanks or other forms of containers to one or more automatic case erectors. Some automatic case erectors may be configured to at least partially assemble some types, sizes, or configurations of blanks or other forms of containers, and other automatic case erectors may be configured to at least partially assemble other types, sizes, or configurations of blanks or other forms of containers, such that the blanks or other forms of containers may be sorted, diverted, distributed, or transported to particular automatic case erectors having associated capabilities. Further, a controller may instruct or command transport of blanks or other forms of containers to automatic case erectors within a material handling facility.

The process 1200 may continue at one or more automatic case erectors, as at 1208. For example, one or more blanks, or other forms of packaged, flattened, or unassembled containers, may be transported or provisioned to an automatic case erector. The automatic case erector may at least partially erect or assemble containers from the blanks, or other forms of packaged, flattened, or unassembled containers. In example embodiments, the automatic case erector may at least partially erect the blanks into boxes having respective bases, side surfaces, and one or more flaps. In other example embodiments, the automatic case erector may at least partially erect or assemble bins, totes, or other types of containers having respective bases, side surfaces, and one or more flaps, flanges, surfaces, extensions, wings, lids, or covers. Further, a controller may instruct or command one or more automatic case erectors to at least partially erect or assemble boxes, bins, totes, or other containers.

The process 1200 may continue with conveyance to induct, as at 1210. For example, one or more conveyance mechanisms, e.g., conveyors, belts, rollers, wheels, slides, chutes, robotic arms or devices, automated vehicles, carts, human associates, or other machinery or equipment, may be used to transfer or transport the partially erected or assembled containers from the automatic case erectors for induction into a container transport or provisioning system as described herein. For example, the conveyance mechanisms may align at least one flap or other portion of the containers in order to be received and engaged by one or more pairs of transport belts of a container provisioning system. In addition, the conveyance mechanisms may align one or more of a base, side surfaces, or other flaps or portions of the containers in order to be contacted and supported by one or more guide surfaces of the container provisioning system. Further, a controller may instruct or command one or more conveyance mechanisms to transfer or transport containers for induction into a container provisioning system.

The process 1200 may then proceed to induction to the belt transport system, as at 1212. For example, one or more pairs of transport belts of a container transport or provisioning system may receive and engage flaps or other portions of containers to be transported within a material handling facility. In some examples, a pair of transport belts may be positioned proximate opposite faces, surfaces, or sides of a flap or other portion of a container with a first distance between the pair of transport belts in order to receive the flap or other portion, and the pair of transport belts may gradually reduce the distance therebetween to a second distance between the pair of transport belts at which the transport belts may engage the flap or other portion of the container with a determined or desired amount of friction. Further, a guide surface may be positioned proximate a base, side surface, or flap or other portion of the container at a first distance from the portion of the container, and the guide surface may gradually reduce the distance from the portion of the container to a second distance at which the guide surface may contact and support the portion of the container. In this manner, a pair of transport belts may receive and engage a flap or other portion of a container, and a guide surface may contact and support a portion of the container, in order to then transport and provision the container to one or more downstream stations or processes. Further, a controller may instruct or command engagement of a portion of the container by the transport belts, and support of a portion of the container by the guide surface, in order to transport and provision the container within a material handling facility.

The process 1200 may continue with transport to a downstream station, as at 1214. For example, the container transport or provisioning system, responsive to having engaged and supported one or more containers by one or more transport belts and guide surfaces, may then transfer, sort, sequence, divert, distribute, store, buffer, accumulate, dispense, transport, and/or provision the containers to various determined or desired downstream stations or processes. As described herein, various additional operations may be performed with respect to the containers during transport, including diverting, sorting, printing, labeling, scanning, imaging, identifying, counting, tracking, packing, picking, accumulating, buffering, storing, dispensing, or other operations. Further, a controller may instruct or command transport of containers to downstream stations within a material handling facility.

The process 1200 may proceed to release at a downstream station, as at 1216. For example, the container transport or provisioning system may release one or more containers from the one or more transport belts and guide surfaces at various downstream stations or processes. In some examples, the downstream stations or processes may comprise packing stations, picking stations, buffer or storage areas, accumulation systems, shipping areas, recycling or disposal areas, or other stations, areas, or processes. Further, a controller may instruct or command release of containers at downstream stations within a material handling facility.

The process 1200 may then end, as at 1218.

Figure 13:
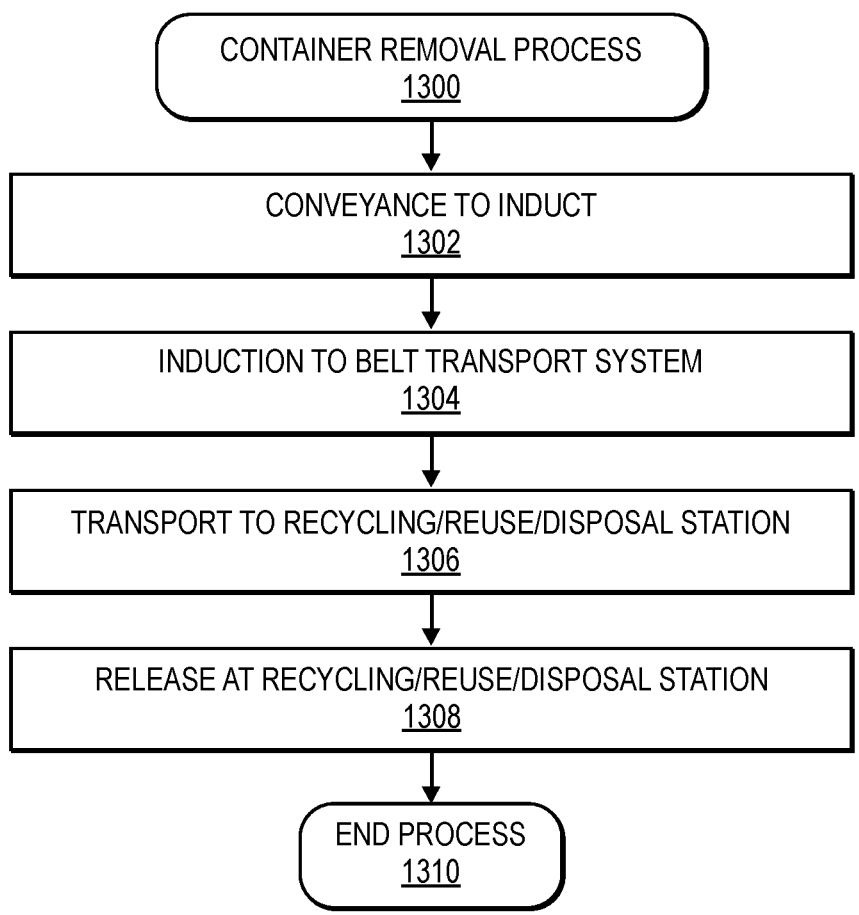
FIG. 13 is a flow diagram illustrating an example container removal process, in accordance with implementations of the present disclosure.

FIG. 13 is a flow diagram illustrating an example container removal process 1300, in accordance with implementations of the present disclosure.

The process 1300 may begin with conveyance to induct, as at 1302. For example, one or more conveyance mechanisms, e.g., conveyors, belts, rollers, wheels, slides, chutes, robotic arms or devices, automated vehicles, carts, human associates, or other machinery or equipment, may be used to transfer or transport partially erected or assembled containers that are empty and/or used from various stations or processes, e.g., upstream stations or processes such as picking, decant, sortation, or other stations or processes, for induction into a container transport or provisioning system as described herein. For example, the conveyance mechanisms may align at least one flap or other portion of the containers in order to be received and engaged by one or more pairs of transport belts of a container provisioning system. In addition, the conveyance mechanisms may align one or more of a base, side surfaces, or other flaps or portions of the containers in order to be contacted and supported by one or more guide surfaces of the container provisioning system. Further, a controller may instruct or command one or more conveyance mechanisms to transfer or transport containers for induction into a container provisioning system.

The process 1300 may then proceed to induction to the belt transport system, as at 1304. For example, one or more pairs of transport belts of a container transport or provisioning system may receive and engage flaps or other portions of containers to be transported within a material handling facility. In some examples, a pair of transport belts may be positioned proximate opposite faces, surfaces, or sides of a flap or other portion of a container with a first distance between the pair of transport belts in order to receive the flap or other portion, and the pair of transport belts may gradually reduce the distance therebetween to a second distance between the pair of transport belts at which the transport belts may engage the flap or other portion of the container with a determined or desired amount of friction. Further, a guide surface may be positioned proximate a base, side surface, or flap or other portion of the container at a first distance from the portion of the container, and the guide surface may gradually reduce the distance from the portion of the container to a second distance at which the guide surface may contact and support the portion of the container. In this manner, a pair of transport belts may receive and engage a flap or other portion of a container, and a guide surface may contact and support a portion of the container, in order to then transport and provision the container to one or more recycling/reuse/disposal stations or processes. Further, a controller may instruct or command engagement of a portion of the container by the transport belts, and support of a portion of the container by the guide surface, in order to transport and provision the container within a material handling facility.

The process 1300 may continue with transport to a recycling/reuse/disposal station, as at 1306. For example, the container transport or provisioning system, responsive to having engaged and supported one or more containers by one or more transport belts and guide surfaces, may then transfer, sort, sequence, divert, distribute, store, buffer, accumulate, dispense, transport, and/or provision the containers to various determined or desired recycling/reuse/disposal stations or processes. As described herein, various additional operations may be performed with respect to the containers during transport, including diverting, sorting, printing, labeling, scanning, imaging, identifying, counting, tracking, accumulating, buffering, storing, dispensing, or other operations. Further, a controller may instruct or command transport of containers to recycling/reuse/disposal stations within a material handling facility.

The process 1300 may proceed to release at a recycling/reuse/disposal station, as at 1308. For example, the container transport or provisioning system may release one or more containers from the one or more transport belts and guide surfaces at various recycling/reuse/disposal stations or processes. In some examples, the recycling/reuse/disposal stations or processes may comprise buffer or storage areas, accumulation systems, shipping areas, recycling or disposal areas, recycling machinery, equipment, or systems, or other stations, areas, or processes. Further, a controller may instruct or command release of containers at recycling/reuse/disposal stations within a material handling facility.

The process 1300 may then end, as at 1310.

Figure 14:
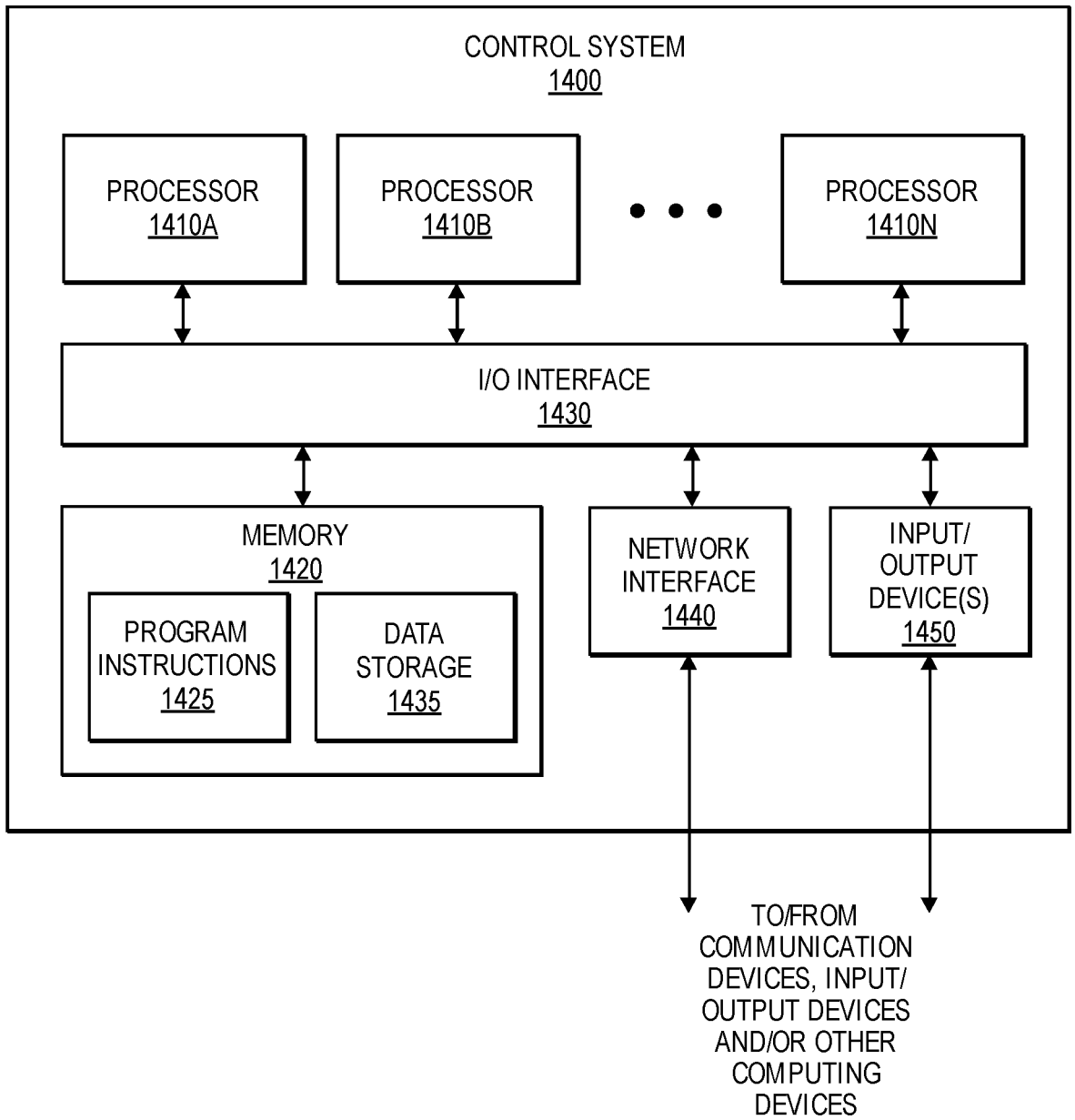
FIG. 14 is a block diagram illustrating various components of an example control system, in accordance with implementations of the present disclosure.

FIG. 14 is a block diagram illustrating various components of an example control system 1400, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 14.

In the illustrated implementation, a control system 1400 includes one or more processors 1410A, 1410B through 1410N, coupled to a non-transitory computer-readable storage medium 1420 via an input/output (I/O) interface 1430. The control system 1400 further includes a network interface 1440 coupled to the I/O interface 1430, and one or more input/output devices 1450. In some implementations, it is contemplated that a described implementation may be implemented using a single instance of the control system 1400 while, in other implementations, multiple such systems or multiple nodes making up the control system 1400 may be configured to host different portions or instances of the described implementations. For example, in one implementation, some data sources or services (e.g., related to portions of container provisioning systems, operations, or processes, etc.) may be implemented via one or more nodes of the control system 1400 that are distinct from those nodes implementing other data sources or services (e.g., related to other portions of container provisioning systems, operations, or processes, etc.).

In various implementations, the control system 1400 may be a uniprocessor system including one processor 1410A, or a multiprocessor system including several processors 1410A 1410N (e.g., two, four, eight, or another suitable number). The processors 1410A-1410N may be any suitable processor capable of executing instructions. For example, in various implementations, the processors 1410A-1410N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1410A-1410N may commonly, but not necessarily, implement the same ISA.

The non-transitory computer-readable storage medium 1420 may be configured to store executable instructions and/or data accessible by the one or more processors 1410A 1410N. In various implementations, the non-transitory computer-readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1420 as program instructions 1425 and data storage 1435, respectively. In other implementations, program instructions and/or data may be received, sent or stored upon different types of computer-accessible media, such as non-transitory media, or on similar media separate from the non-transitory computer-readable storage medium 1420 or the control system 1400. Generally speaking, a non-transitory, computer-readable storage medium may include storage media or memory media such as magnetic or optical media, e.g., disk or CD/DVD-ROM, coupled to the control system 1400 via the I/O interface 1430. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1440.

In one implementation, the I/O interface 1430 may be configured to coordinate I/O traffic between the processors 1410A-1410N, the non-transitory computer-readable storage medium 1420, and any peripheral devices, including the network interface 1440 or other peripheral interfaces, such as input/output devices 1450. In some implementations, the I/O interface 1430 may perform any necessary protocol, timing or other data transformations to convert data signals from one component (e.g., non-transitory computer-readable storage medium 1420) into a format suitable for use by another component (e.g., processors 1410A 1410N). In some implementations, the I/O interface 1430 may include support for devices attached through various types of peripheral buses, such as a variant of the Peripheral Component Interconnect (PCI) bus standard or the Universal Serial Bus (USB) standard, for example. In some implementations, the function of the I/O interface 1430 may be split into two or more separate components, such as a north bridge and a south bridge, for example. Also, in some implementations, some or all of the functionality of the I/O interface 1430, such as an interface to the non-transitory computer-readable storage medium 1420, may be incorporated directly into the processors 1410A-1410N.

The network interface 1430 may be configured to allow data to be exchanged between the control system 1400 and other devices attached to a network, such as other control systems, material handling system controllers, warehouse management systems, other computer systems, robotic or automated arms, machines, or systems, various types of sensors, various types of vision systems, imaging devices, or imaging sensors, upstream stations or processes, downstream stations or processes, other material handling systems or equipment, or between nodes of the control system 1400. In various implementations, the network interface 1440 may support communication via wired or wireless general data networks, such as any suitable type of Ethernet network.

Input/output devices 1450 may, in some implementations, include one or more displays, monitors, projection devices, other video input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1400. Multiple input/output devices 1450 may be present in the control system 1400 or may be distributed on various nodes of the control system 1400. In some implementations, similar input/output devices may be separate from the control system 1400 and may interact with one or more nodes of the control system 1400 through a wired or wireless connection, such as over the network interface 1440.

As shown in FIG. 14, the memory 1420 may include program instructions 1425 that may be configured to implement one or more of the described implementations and/or provide data storage 1435, which may comprise various tables, data stores and/or other data structures accessible by the program instructions 1425. The program instructions 1425 may include various executable instructions, programs, or applications to facilitate container transport or provisioning operations and processes described herein, such as actuator controllers, drivers, or applications, transport belt controllers, drivers, or applications, guide surface controllers, drivers, or applications, sensor controllers, drivers, or applications, sensor data processing applications, vision system or imaging device controllers, drivers, or applications, imaging data processing applications, sortation controllers, drivers, or applications, additional operation controllers, drivers, or applications, accumulation controllers, drivers, or applications, material handling equipment controllers, drivers, or applications, upstream station controllers, drivers, or applications, downstream station controllers, drivers, or applications, etc. The data storage 1435 may include various data stores for maintaining data related to systems, operations, or processes described herein, such as container transport systems, actuators, transport belts, guide surfaces, sensors, sensor data, vision systems or imaging devices, imaging data, blanks, boxes, containers, container data, items or objects, item or object data, container sortation systems, additional equipment, machinery, systems, or devices, container accumulation systems, material handling equipment or apparatus, upstream systems, stations, or processes, downstream systems, stations, or processes, etc.

Those skilled in the art will appreciate that the control system 1400 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10-13, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A box provisioning system, comprising:
an automatic box erector configured to erect a box from a blank, the box comprising a base, at least one side surface, and at least one flap;
a conveyance mechanism configured to receive the box from the automatic box erector; and
a pinch belt transport system configured to receive the box from the conveyance mechanism, the pinch belt transport system comprising a pair of pinch belts configured to engage the at least one flap of the box and configured to transport the box to a downstream station via the at least one flap;
wherein the pinch belt transport system further comprises at least one guide surface configured to support at least one of the base, the at least one side surface, or the at least one flap of the box during transport.

2. The box provisioning system of claim 1, further comprising:
a receive station configured to receive the blank;
wherein a portion of the pinch belt transport system is further configured to receive the blank from the receive station and configured to transport the blank to the automatic box erector.

3. The box provisioning system of claim 1, further comprising:
a second conveyance mechanism configured to receive an empty box from the downstream station;
wherein a portion of the pinch belt transport system is further configured to receive the empty box from the second conveyance mechanism, the portion of the pinch belt transport system configured to engage a flap of the empty box via the pair of pinch belts and configured to transport the empty box to a recycling station via the flap.

4. The box provisioning system of claim 1, wherein the pinch belt transport system further comprises an actuator configured to drive the pair of pinch belts; and
wherein the at least one guide surface comprises at least one of an active or a passive guide surface.

5. The box provisioning system of claim 1, wherein the pair of pinch belts and the at least one guide surface extend substantially parallel with each other.

6. A container transport system, comprising:
a pair of transport belts configured to engage a first portion of a container therebetween, the first portion of the container comprising at least one of a flap, flange, extension, wing, lid, or cover of the container, and the container comprising at least one of a box, tote, or bin;
an actuator configured to cause movement of the pair of transport belts to transport the container; and
a guide surface configured to support a second portion of the container during transport of the container by the pair of transport belts.

7. The container transport system of claim 6, wherein the pair of transport belts engage the first portion of the container using friction.

8. The container transport system of claim 7, wherein an amount of friction applied by the pair of transport belts to the first portion of the container depends upon at least one of a spacing between the pair of transport belts, a tension along the pair of transport belts, or a force applied to the pair of transport belts.

9. The container transport system of claim 7, wherein a first belt of the pair of transport belts applies a first amount of friction to the first portion of the container, and a second belt of the pair of transport belts applies a second amount of friction to the first portion of the container;
wherein the first amount of friction and the second amount of friction are different.

10. The container transport system of claim 7, wherein at least one of the pair of transport belts includes at least one of ribs, protrusions, or dimples.

11. The container transport system of claim 6, wherein the pair of transport belts include at least one of a bend, curve, or twist along a length thereof.

12. The container transport system of claim 6, wherein the guide surface comprises at least one of a passive surface or an active surface;
wherein the guide surface comprises at least one of a flat surface, slide, pole, bar, beam, belt, conveyor, roller, or wheel.

13. The container transport system of claim 12, wherein the second portion of the container comprises at least one of a base, side surface, flap, flange, surface, extension, wing, lid, or cover of the container.

14. The container transport system of claim 6, further comprising:
a transition section of the container transport system that comprises a single transport belt and an additional component configured to engage the first portion of the container;
wherein the additional component comprises at least one of a roller, wheel, bullwheel, spring-loaded friction shoe, or one or more orifices associated with the single transport belt that are configured to provide vacuum pressure.

15. A method to provision a container, comprising:
engaging, via a pair of transport belts, a first portion of a container between the pair of transport belts, the first portion of the container comprising at least one of a flap, flange, extension, wing, lid, or cover of the container, and the container comprising at least one of a box, tote, or bin; and
causing movement, by an actuator, of the pair of transport belts to transport the container to a downstream station;
wherein a second portion of the container is supported by a guide surface during transport of the container by the pair of transport belts.

16. The method of claim 15, further comprising:
detecting, by a sensor, the container during transport by the pair of transport belts;
determining, by a controller, that the container is to be diverted to a second pair of transport belts; and
instructing, by the controller, actuation of a gate to divert the container to the second pair of transport belts.

17. The method of claim 15, further comprising:
detecting, by a sensor, the container during transport by the pair of transport belts;
determining, by a controller, that an additional operation is to be performed with respect to the container during transport; and
instructing, by the controller, the additional operation with respect to the container during transport.

18. The method of claim 17, wherein the additional operation comprises at least one of printing onto the container, adhering a label onto the container, packing an item into the container, scanning the container, identifying the container, sorting the container, counting the container, or tracking the container.

19. The method of claim 15, further comprising:
detecting, by a sensor, the container during transport by the pair of transport belts;
determining, by a controller, to release and buffer the container at an accumulation magazine proximate the downstream station; and
causing release, by the pair of transport belts, of the container at the accumulation magazine.

* * * * *